United States Patent
Oizumi et al.

(10) Patent No.: US 9,461,801 B2
(45) Date of Patent: Oct. 4, 2016

(54) TERMINAL DEVICE, BASE STATION DEVICE, TRANSMISSION METHOD, AND RECEIVING METHOD

(71) Applicant: Panasonic Intellectual Property Corporation of America, Torrance, CA (US)

(72) Inventors: Toru Oizumi, Osaka (JP); Takashi Tamura, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 94 days.

(21) Appl. No.: 14/399,149
(22) PCT Filed: Mar. 15, 2013
(86) PCT No.: PCT/JP2013/001770
§ 371 (c)(1),
(2) Date: Nov. 5, 2014
(87) PCT Pub. No.: WO2013/179540
PCT Pub. Date: Dec. 5, 2013

(65) Prior Publication Data
US 2015/0124725 A1 May 7, 2015

(30) Foreign Application Priority Data
May 31, 2012 (JP) ................................ 2012-124561

(51) Int. Cl.
*H04L 5/00* (2006.01)
*H04W 72/04* (2009.01)
(Continued)

(52) U.S. Cl.
CPC ............ *H04L 5/0055* (2013.01); *H04J 11/003* (2013.01); *H04L 5/001* (2013.01);
(Continued)

(58) Field of Classification Search
CPC ............... H04B 7/0669; H04B 7/0673; H04J 11/0026; H04J 11/003; H04J 11/0046; H04L 1/1861; H04L 5/001; H04L 5/0037; H04L 5/0048; H04L 5/0053; H04L 5/0055; H04W 52/243; H04W 52/48; H04W 72/04; H04W 72/0413; H04W 72/042
See application file for complete search history.

(56) References Cited

U.S. PATENT DOCUMENTS

2012/0082263 A1* 4/2012 Ebrahimi Tazeh Mahalleh ............ H04B 7/0669 375/299
2012/0113944 A1* 5/2012 Yang ..................... H04L 1/1861 370/329

OTHER PUBLICATIONS

Nakao et al., "Performance enhancement of E-UTRA uplink control channel in fast fading environments," IEEE 69th Vehicular Technology Conference, VTC Spring 2009, 5 pages.
(Continued)

*Primary Examiner* — Khoa Huynh
(74) *Attorney, Agent, or Firm* — Seed IP Law Group PLLC

(57) ABSTRACT

A control unit (208) employs instruction information which instructs a unit band which is employed in the transmission of a response signal to transmit the response signal. A first unit band and a second unit band which differs from the first unit band are included in the plurality of unit bands. The first unit band is employed in the transmission of the response signal when downstream data is simultaneously assigned to both the first unit band and the second unit band. When at least the second unit band downstream circuit data is assigned, the second unit band is employed in making a notification of the instruction information. When the downstream circuit data is simultaneously assigned to both the first unit band and the second unit band, the unit band which is denoted in the instruction information is the first unit band.

11 Claims, 16 Drawing Sheets

(51) Int. Cl.
  *H04W 52/24* (2009.01)
  *H04W 52/48* (2009.01)
  *H04J 11/00* (2006.01)
  *H04L 1/18* (2006.01)
(52) U.S. Cl.
  CPC .......... *H04L 5/0037* (2013.01); *H04L 5/0048* (2013.01); *H04L 5/0053* (2013.01); *H04W 52/243* (2013.01); *H04W 52/48* (2013.01); *H04W 72/04* (2013.01); *H04W 72/0413* (2013.01); *H04J 11/0046* (2013.01); *H04L 1/1861* (2013.01)

(56) References Cited

OTHER PUBLICATIONS

ZTE, "Uplink Control Channel Design for LTE-Advanced," R1-091702, TSG-RAN WG1 #57, Agenda Item: 15.4, San Francisco, USA, May 4-8, 2009, 6 pages.
Panasonic, "UL ACK/NACK transmission on PUCCH for carrier aggregation," R1-091744, 3GPP TSG-RAN WG1 Meeting #57, Agenda Item: 15.4, San Francisco, USA, May 4-8, 2009, 3 pages.
Panasonic, "UL ACK/NACK transmission on PUCCH for carrier aggregation," R1-093942, 3GPP TSG-RAN WG1 Meeting #58bis, Agenda Item: 7.2.3, Miyazaki, Japan, Oct. 12-16, 2009, 4 pages.
Ericsson, ST-Ericsson, "A/N transmission in the uplink for carrier aggregation," R1-100909, 3GPP TSG-RAN WG1 #60, Agenda Item: 7.1.6, San Francisco, USA, Feb. 22-26, 2010, 4 pages.
Research in Motion, UK Limited, "UCI Transmission in the Presence of UL-SCH data," R1-103067, 3GPP TSG RAN WG1 Meeting #61, Agenda item: 6.2.4.3, Montreal Canada, May 10-14, 2010, 2 pages.
Panasonic, "ACK/NACK multiplexing schemes on PUSCH," R1-103760, 3GPP TSG RAN WG1 Meeting #61bis, Agenda Item: 6.2.7 UCI on PUSCH, Dresden, Germany, Jun. 28-Jul. 2, 2010, pp. 1-3.
3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)," Dec. 2011, 101 pages.
3GPP TS 36.212 V10.5.0, "3rd Generation Partnership Project; Technical Specification Group Radio Access Network; Evolved Universal Terrestrial Radio Access (E-UTRA); Multiplexing and channel coding (Release 10)," Mar. 2012, 79 pages.
3GPP TS 36.213 V10.5.0, "3rd Generation Partnership Project; Technical Specification Group Radio Access Network; Evolved Universal Terrestrial Radio Access (E-UTRA); Physical layer procedures (Release 10)," Mar. 2012, 125 pages.
International Search Report dated May 14, 2013, for corresponding International Application No. PCT/JP2013/001770, 3 pages.

* cited by examiner

TERMINAL DEVICE, BASE STATION DEVICE, TRANSMISSION METHOD, AND RECEIVING METHOD

TECHNICAL FIELD

The present invention relates to a terminal apparatus, a base station apparatus, a transmission method and a reception method.

BACKGROUND ART

3GPP LTE employs Orthogonal Frequency Division Multiple Access (OFDMA) as a downlink communication scheme. In radio communication systems to which 3GPP LTE is applied, base stations transmit synchronization signals (i.e., Synchronization Channel: SCH) and broadcast signals (i.e., Broadcast Channel: BCH) using predetermined communication resources. Meanwhile, each terminal finds an SCH first and thereby ensures synchronization with the base station. Subsequently, the terminal reads BCH information to acquire base station-specific parameters (e.g., frequency bandwidth) (see, Non-Patent Literature (hereinafter, abbreviated as NPL) 1, 2 and 3).

In addition, upon completion of the acquisition of the base station-specific parameters, each terminal sends a connection request to the base station to thereby establish a communication link with the base station. The base station transmits control information via Physical Downlink Control CHannel (PDCCH) as appropriate to the terminal with which a communication link has been established via a downlink control channel or the like.

The terminal performs "blind-determination" on each of a plurality of pieces of control information included in the received PDCCH signal (i.e., Downlink (DL) Assignment Control Information: also referred to as Downlink Control Information (DCI)). More specifically, each piece of the control information includes a Cyclic Redundancy Check (CRC) part and the base station masks this CRC part using the terminal ID of the transmission target terminal. Accordingly, until the terminal demasks the CRC part of the received piece of control information with its own terminal ID, the terminal cannot determine whether or not the piece of control information is intended for the terminal. In this blind-determination, if the result of demasking the CRC part indicates that the CRC operation is OK, the piece of control information is determined as being intended for the terminal.

Moreover, in 3GPP LTE, Automatic Repeat Request (ARQ) is applied to downlink data to terminals from a base station. More specifically, each terminal feeds back a response signal indicating the result of error detection on the downlink data to the base station. Each terminal performs a CRC on the downlink data and feeds back Acknowledgment (ACK) when CRC=OK (no error) or Negative Acknowledgment (NACK) when CRC=Not OK (error) to the base station as a response signal. An uplink control channel such as Physical Uplink Control Channel (PUCCH) is used to feed back the response signals (i.e., ACK/NACK signals (hereinafter, may be referred to as "A/N," simply)).

The control information to be transmitted from a base station herein includes resource assignment information including information on resources assigned to the terminal by the base station. As described above, PDCCH is used to transmit this control information. This PDCCH includes one or more L1/L2 control channels (L1/L2 CCH). Each L1/L2 CCH consists of one or more Control Channel Elements (CCE). More specifically, a CCE is the basic unit used to map the control information to PDCCH. Moreover, when a single L1/L2 CCH consists of a plurality of CCEs (2, 4 or 8), a plurality of contiguous CCEs starting from a CCE having an even index are assigned to the L1/L2 CCH. The base station assigns the L1/L2 CCH to the resource assignment target terminal in accordance with the number of CCEs required for indicating the control information to the resource assignment target terminal. The base station maps the control information to physical resources corresponding to the CCEs of the L1/L2 CCH and transmits the mapped control information.

In addition, CCEs are associated with component resources of PUCCH (hereinafter, may be referred to as "PUCCH resource") in a one-to-one correspondence. Accordingly, a terminal that has received an L1/L2 CCH identifies the component resources of PUCCH that correspond to the CCEs forming the L1/L2 CCH and transmits a response signal to the base station using the identified resources. However, when the L1/L2 CCH occupies a plurality of contiguous CCEs, the terminal transmits the response signal to the base station using a PUCCH component resource corresponding to a CCE having a smallest index among the plurality of PUCCH component resources respectively corresponding to the plurality of CCEs (i.e., PUCCH component resource associated with a CCE having an even numbered CCE index). In this manner, the downlink communication resources are efficiently used.

As illustrated in FIG. 1, a plurality of response signals transmitted from a plurality of terminals are spread using a Zero Auto-correlation (ZAC) sequence having the characteristic of zero autocorrelation in time-domain, a Walsh sequence and a discrete Fourier transform (DFT) sequence, and are code-multiplexed in a PUCCH. In FIG. 1, (W0, W1, W2, W3) represent a length-4 Walsh sequence and (F0, F1, F2) represent a length-3 DFT sequence. As illustrated in FIG. 1, ACK or NACK response signals are primary-spread over frequency components corresponding to 1 SC-FDMA symbol by a ZAC sequence (length-12) in frequency-domain. To put it more specifically, the length-12 ZAC sequence is multiplied by a response signal component represented by a complex number. Subsequently, the ZAC sequence serving as the response signals and reference signals after the primary-spread is secondary-spread in association with each of a Walsh sequence (length-4: W0-W3 (may be referred to as Walsh Code Sequence)) and a DFT sequence (length-3: F0-F2). More specifically, each component of the signals of length-12 (i.e., response signals after primary-spread or ZAC sequence serving as reference signals (i.e., Reference Signal Sequence) is multiplied by each component of an orthogonal code sequence (i.e., orthogonal sequence: Walsh sequence or DFT sequence). Moreover, the secondary-spread signals are transformed into signals of length-12 in the time-domain by inverse fast Fourier transform (IFFT). A CP is added to each signal obtained by IFFT processing, and the signals of one slot consisting of seven SC-FDMA symbols are thus formed.

The response signals from different terminals are spread using ZAC sequences each corresponding to a different cyclic shift value (i.e., index) or orthogonal code sequences each corresponding to a different sequence number (i.e., orthogonal cover index (OC index)). An orthogonal code sequence is a combination of a Walsh sequence and a DFT sequence. In addition, an orthogonal code sequence is referred to as a block-wise spreading code in some cases. Thus, base stations can demultiplex the code-multiplexed plurality of response signals using the related art despreading and correlation processing (see, NPL 4).

However, it is not necessarily true that each terminal succeeds in receiving downlink assignment control signals because the terminal performs blind-determination in each subframe to find downlink assignment control signals intended for the terminal. When the terminal fails to receive the downlink assignment control signals intended for the terminal on a certain downlink component carrier, the terminal would not even know whether or not there is downlink data intended for the terminal on the downlink component carrier. Accordingly, when a terminal fails to receive the downlink assignment control signals intended for the terminal on a certain downlink component carrier, the terminal generates no response signals for the downlink data on the downlink component carrier. This error case is defined as discontinuous transmission of ACK/NACK signals (DTX of response signals) in the sense that the terminal transmits no response signals.

In 3GPP LTE systems (may be referred to as "LTE system," hereinafter), base stations assign resources to uplink data and downlink data, independently. For this reason, in the 3GPP LTE system, terminals (i.e., terminals compliant with LTE system (hereinafter, referred to as "LTE terminal")) encounter a situation where the terminals need to transmit uplink data and response signals for downlink data simultaneously in the uplink. In this situation, the response signals and uplink data from the terminals are transmitted using time-division multiplexing (TDM). As described above, the single carrier properties of transmission waveforms of the terminals are maintained by the simultaneous transmission of response signals and uplink data using TDM.

In addition, as illustrated in FIG. 2, the response signals (i.e., "A/N") transmitted from each terminal partially occupy the resources assigned to uplink data (i.e., Physical Uplink Shared CHannel (PUSCH) resources) (i.e., response signals occupy some SC-FDMA symbols adjacent to SC-FDMA symbols to which reference signals (RS) are mapped) and are thereby transmitted to a base station in time-division multiplexing (TDM). However, "subcarriers" in the vertical axis in FIG. 2 are also termed as "virtual subcarriers" or "time contiguous signals," and "time contiguous signals" that are collectively inputted to a discrete Fourier transform (DFT) circuit in a SC-FDMA transmitter are represented as "subcarriers" for convenience. More specifically, optional data of the uplink data is punctured due to the response signals in the PUSCH resource. Accordingly, the quality of uplink data (e.g., coding gain) is significantly reduced due to the punctured bits of the coded uplink data. For this reason, base stations instruct the terminals to use a very low coding rate and/or to use very large transmission power so as to compensate for the reduced quality of the uplink data due to the puncturing.

Meanwhile, the standardization of 3GPP LTE-Advanced for realizing faster communication than 3GPP LTE is in progress. 3GPP LTE-Advanced systems (may be referred to as "LTE-A system," hereinafter) follow LTE systems. 3GPP LTE-Advanced will introduce base stations and terminals capable of communicating with each other using a wideband frequency of 40 MHz or greater to realize a downlink transmission rate of up to 1 Gbps or above.

In the LTE-A system, in order to simultaneously achieve backward compatibility with the LTE system and ultra-high-speed communication several times faster than transmission rates in the LTE system, the LTE-A system band is divided into "component carriers" of 20 MHz or below, which is the bandwidth supported by the LTE system. In other words, the "component carrier" is defined herein as a band having a maximum width of 20 MHz and as the basic unit of communication band. In the Frequency Division Duplex (FDD) system, moreover, "component carrier" in downlink (hereinafter, referred to as "downlink component carrier") is defined as a band obtained by dividing a band according to downlink frequency bandwidth information in a BCH broadcasted from a base station or as a band defined by a distribution width when a downlink control channel (PD-CCH) is distributed in the frequency domain. In addition, "component carrier" in uplink (hereinafter, referred to as "uplink component carrier") may be defined as a band obtained by dividing a band according to uplink frequency band information in a BCH broadcasted from a base station or as the basic unit of a communication band of 20 MHz or below including a Physical Uplink Shared CHannel (PUSCH) in the vicinity of the center of the bandwidth and PUCCHs for LTE on both ends of the band. In addition, the term "component carrier" may be also referred to as "cell" in English in 3GPP LTE-Advanced. Furthermore, "component carrier" may also be abbreviated as CC(s).

The LTE-A system supports communication using a band obtained by bundling some component carriers, so-called carrier aggregation (CA). Note that while a UL-DL terminal may receive a plurality of pieces of downlink data on a plurality of downlink component carriers at a time. In LTE-A, channel selection (also referred to as "multiplexing"), bundling and a discrete Fourier transform spread orthogonal frequency division multiplexing (DFT-S-OFDM) format are available as a method of transmitting a plurality of response signals for the plurality of pieces of downlink data. In channel selection, a terminal causes not only symbol points used for response signals, but also the resources to which the response signals are mapped to vary in accordance with the pattern for results of the error detection on the plurality of pieces of downlink data. Compared with channel selection, in bundling, the terminal bundles ACK or NACK signals generated according to the results of error detection on the plurality of pieces of downlink data (i.e., by calculating a logical AND of the results of error detection on the plurality of pieces of downlink data, provided that ACK=1 and NACK=0), and response signals are transmitted using one predetermine resource. In transmission using the DFT-S-OFDM format, a terminal jointly encodes (i.e., joint coding) the response signals for the plurality of pieces of downlink data and transmits the coded data using the format (see, NPL 5). For example, a terminal may feed back the response signals (i.e., ACK/NACK) using channel selection, bundling or DFT-S-OFDM according to the number of bits for a pattern for results of error detection. Alternatively, a base station may previously configure the method of transmitting the response signals.

Channel Selection is a technique that varies not only the phase points (i.e., constellation points) for the response signals but also the resources used for transmission of the response signals (may be referred to as "PUCCH resource," hereinafter) on the basis of whether the results of error detection on the plurality of pieces of downlink data for each downlink component carrier received on the plurality of downlink component carriers (a maximum of two downlink component carriers) are each an ACK or NACK as illustrated in FIG. 4. Meanwhile, bundling is a technique that bundles ACK/NACK signals for the configuration can be set for each component carrier, an LTE-A system compliant terminal (hereinafter, referred to as "LTE-A terminal") is designed assuming that the same UL-DL configuration is set among a plurality of component carriers.

FIGS. 3A and 3B are diagrams provided for describing asymmetric carrier aggregation and a control sequence of the asymmetric carrier aggregation applicable to individual terminals.

As illustrated in FIG. 3B, a configuration in which carrier aggregation is performed using two downlink component carriers and one uplink component carrier on the left is set for terminal 1, while a configuration in which the two downlink component carriers identical with those used by terminal 1 are used but uplink component carrier on the right is used for uplink communication is set for terminal 2.

Referring to terminal 1, a base station included an LTE-A system (that is, LTE-A system compliant base station (hereinafter, referred to as "LTE-A base station") and an LTE-A terminal included in the LTE-A system transmit and receive signals to and from each other in accordance with the sequence diagram illustrated in FIG. 3A. As illustrated in FIG. 3A, (1) terminal 1 is synchronized with the downlink component carrier on the left when starting communications with the base station and reads information on the uplink component carrier paired with the downlink component carrier on the left from a broadcast signal called system information block type 2 (SIB2). (2) Using this uplink component carrier, terminal 1 starts communication with the base station by transmitting, for example, a connection request to the base station. (3) Upon determining that a plurality of downlink component carriers need to be assigned to the terminal, the base station instructs the terminal to add a downlink component carrier. However, in this case, the number of uplink component carriers does not increase, and terminal 1, which is an individual terminal, starts asymmetric carrier aggregation.

In addition, in the LTE-A system to which carrier aggregation is applied, a plurality of pieces of downlink data into a single set of signals and thereby transmits the bundled signals using one predetermined resource (see, NPLs 6 and 7). Hereinafter, the set of the signals formed by bundling ACK/NACK signals for a plurality of pieces of downlink data into a single set of signals may be referred to as "bundled ACK/NACK signals."

The following two methods are considered as a possible method of transmitting response signals in uplink when a terminal receives downlink assignment control information via a PDCCH and receives downlink data.

One of the methods is to transmit response signals using a PUCCH resource associated in a one-to-one correspondence with a control channel element (CCE) occupied by the PDCCH (i.e., implicit signaling) (hereinafter, method 1). More specifically, when DCI intended for a terminal served by a base station is mapped in a PDCCH region, each PDCCH occupies a resource consisting of one or a plurality of contiguous CCEs. In addition, as the number of CCEs occupied by a PDCCH (i.e., the number of aggregated CCEs: CCE aggregation level), one of aggregation levels 1, 2, 4 and 8 is selected according to the number of information bits of the assignment control information or a propagation path condition of the terminal, for example.

The other method is to previously indicate a PUCCH resource to each terminal from a base station (i.e., explicit signaling) (hereinafter, method 2). To put it differently, each terminal transmits response signals using the PUCCH resource previously indicated by the base station in method 2.

Furthermore, as shown in FIG. 4, the terminal transmits response signals using one of two component carriers. A component carrier that transmits such response signals is called "primary component carrier (PCC) or primary cell (PCell)." The other component carrier is called "secondary component carrier (SCC) or secondary cell (SCell)." For example, the PCC (PCell) is a component carrier that transmits broadcast information on a component carrier that transmits response signals (e.g., system information block type 1 (SIB1)).

In method 2, PUCCH resource common to a plurality of terminals (e.g., four PUCCH resources) may be previously indicated to the terminals from a base station. For example, terminals may employ a method to select one PUCCH resource to be actually used, on the basis of a transmit power control (TPC) command of two bits included in DCI in SCell. In this case, the TPC command is also called an ACK/NACK resource indicator (ARI). Such a TPC command allows a certain terminal to use an explicitly signaled PUCCH resource in a certain subframe while allowing another terminal to use the same explicitly signaled PUCCH resource in another subframe in the case of explicit signaling.

Meanwhile, in channel selection, a PUCCH resource in an uplink component carrier associated in a one-to-one correspondence with the top CCE index of the CCEs occupied by the PDCCH indicating the PDSCH in PCC (PCell) (i.e., PUCCH resource in PUCCH region 1 in FIG. 4) is assigned (implicit signaling).

Here, ARQ control using channel selection when the above asymmetric carrier aggregation is applied to a terminal will be described with reference to FIG. 4.

For example, in FIG. 4, a component carrier group (may be referred to as "component carrier set" in English) consisting of component carrier 1 (PCell) and component carrier 2 (SCell) is set for terminal 1. In this case, after downlink resource assignment information is transmitted to terminal 1 from the base station via a PDCCH of each of component carriers 1 and 2, downlink data is transmitted using the resource corresponding to the downlink resource assignment information.

Furthermore, in channel selection, response signals representing error detection results corresponding to a plurality of pieces of downlink data in component carrier 1 (PCell) and error detection results corresponding to a plurality of pieces of downlink data in component carrier 2 (SCell) are mapped to PUCCH resource included in PUCCH region 1 or PUCCH region 2. The terminal uses two types of phase points (Binary Phase Shift Keying (BPSK) mapping) or four types of phase points (Quadrature Phase Shift Keying (QPSK) mapping) as response signals thereof. That is, in channel selection, it is possible to express a pattern for results of error detection corresponding to a plurality of pieces of downlink data in component carrier 1 (PCell) and the results of error detection corresponding to a plurality of pieces of downlink data in component carrier 2 (SCell) by a combination of PUCCH resource and phase points.

In general, when PCell and SCell are configured in the terminal, a band (CC) used by a base station having a wide coverage area is assumed to be PCell and a band (CC) used by a base station having a narrow coverage area is assumed to be SCell irrespective of whether the system is an FDD system or a TDD system. LTE-Advanced assumes carrier aggregation among macro cells (macro eNBs) having a wide coverage area. For this reason, SCell for a certain terminal can be operated as PCell for another terminal, and therefore even if each terminal always sends PUCCH using PCell, it is possible to balance PUCCH overhead among macro cells.

LTE-Advanced further assumes carrier aggregation in a HetNet (Heterogeneous Network) environment that combines a macro cell having a large coverage area covered by macro eNB and a picocell having a small coverage area covered by a pico eNB as shown in FIG. 5. In this case, for many terminals, a band (CC) used by a macro cell having a large coverage is operated as PCell and a band (CC) used by a picocell having a narrow coverage is operated as SCell. That is, since there are many terminals that operate the macro cell shown in FIG. 5 as PCell, there is a concern that PUCCH overhead in the macro cell may increase as the number of terminals increases or downlink data communication in terminals increases. In a HetNet environment, the distance between a terminal and pico eNB is generally smaller than the distance between a terminal and macro eNB. Therefore, transmitting PUCCH to pico eNB which has a smaller distance from the terminal is advantageous in terms of a reduction of transmission power in the terminal and reduction of interference with other terminals.

In view of the above-described circumstances, in carrier aggregation in a HetNet environment, there is a high possibility that PUCCH transmission needs to be performed using SCell rather than PCell.

Since performing PUCCH transmission using SCell presupposes that carrier aggregation be configured, the terminal is assumed to make a connection using PCell (performs PUCCH transmission using PCell for that purpose) first and perform operation of switching between CCs (PUCCH transmission cells) through which PUCCH is transmitted from PCell to SCell based on an instruction from the base station.

As the method of switching between PUCCH transmission cells, two methods may be used. One is a configuration-based method and the other is an assignment-based method.

The configuration-based method is a method whereby PUCCH transmission cells are switched through RRC signaling by a base station.

The assignment-based method is a method whereby PUCCH transmission cells are switched in accordance with a combination of cells to which a base station assigns a downlink data channel (PDSCH). For this reason, PUCCH transmission cells dynamically vary in subframe units. For example, when only PDSCH is assigned in PCell, PUCCH is transmitted using PCell to secure mobility of the terminal. On the other hand, when only PDSCH is assigned in SCell, PUCCH is transmitted using SCell to reduce PUCCH overhead, PUCCH transmission power and interference. When PDSCHs are simultaneously assigned in PCell and SCell, PUCCH is transmitted using PCell or SCell depending on the purpose.

CITATION LIST

Non-Patent Literature

NPL 1
3GPP TS 36.211 V10.4.0, "Physical Channels and Modulation (Release 10)," December 2011
NPL 2
3GPP TS 36.212 V10.5.0, "Multiplexing and channel coding (Release 10)," March 2012
NPL 3
3GPP TS 36.213 V10.5.0, "Physical layer procedures (Release 10)," March 2012
NPL 4
Seigo Nakao, Tomofumi Takata, Daichi Imamura, and Katsuhiko Hiramatsu, "Performance enhancement of E-UTRA uplink control channel in fast fading environments," Proceeding of IEEE VTC 2009 spring, April 2009
NPL 5
Ericsson and ST-Ericsson, "A/N transmission in the uplink for carrier aggregation," R1-100909, 3GPP TSG-RAN WG1 #60, February 2010
NPL 6
ZTE, 3GPP RANI meeting #57, R1-091702, "Uplink Control Channel Design for LTE-Advanced," May 2009
NPL 7
Panasonic, 3GPP RANI meeting #57, R1-091744, "UL ACK/NACK transmission on PUCCH for Carrier aggregation," May 2009

SUMMARY OF INVENTION

Technical Problem

As described above, according to the assignment-based PUCCH transmission cell switching method, PUCCH transmission cells are switched in accordance with a combination of cells (CCs) to which the base station assigns a downlink data channel (PDSCH). However, even if the base station performs PDSCH assignment in a certain cell, the terminal may fail to receive PDCCH (DL assignment) indicating the PDSCH assignment. In this case, there is concern that the cell from which the base station expects to receive PUCCH may be different from the cell in which the terminal actually performs PUCCH transmission.

FIG. 6 illustrates exemplary cases where the base station expects to receive PUCCH in PCell when only PCell PDSCH is assigned, expects to receive PUCCH in SCell when only SCell PDSCH is assigned, and expects to receive PUCCH in PCell when PDSCHs are simultaneously assigned in PCell and SCell, giving priority to securing of mobility in the terminal.

When the base station simultaneously assigns PDSCHs in PCell and SCell, if the terminal fails to receive PDCCH indicating PCell PDSCH assignment, the terminal determines that only SCell PDSCH has been assigned and transmits PUCCH in SCell.

Therefore, when the base station simultaneously assigns PDSCHs in PCell and SCell, the base station needs to detect PUCCHs of both PCell and SCell, compare PUCCH receiving power and detect which cell (CC) is used for the terminal to transmit an error detection result in preparation for a failure in PDCCH reception by the terminal.

However, since communication paths (channel environment) are different between PCell and SCell, channel states are also different. Thus, even if transmission power control is performed appropriately in both cells of PCell and SCell, receiving quality of PUCCH differs between PCell and SCell due to a fluctuation in the channel states. As a result, detection using a comparison of receiving power of PUCCH is not performed correctly in the base station and it is not possible to detect error detection results (ACK/NACK) correctly.

An object of the present invention is to provide a terminal apparatus, a base station apparatus, a transmission method and a reception method capable of preventing deterioration in detection accuracy of PUCCH.

Solution to Problem

A terminal apparatus according to an aspect of the present invention is a terminal apparatus that communicates with a base station apparatus using a plurality of component carriers, the terminal apparatus including: a generating section that generates a response signal using error detection results of downlink data transmitted using the plurality of component carriers; and a control section that transmits the response signal using a component carrier indicated by indication information that indicates a component carrier to be used for transmission of the response signal, in which: the plurality of component carriers include a first component carrier and a second component carrier which is different from the first component carrier, the first component carrier being a component carrier used for transmission of the response signal when downlink data is simultaneously assigned to both the first component carrier and the second component carrier; the indication information is indicated from the base station apparatus using the second component carrier when downlink data of at least the second component carrier is assigned; and when downlink data is simultaneously assigned to both the first component carrier and the second component carrier, the component carrier indicated by the indication information is the first component carrier.

A base station apparatus according to an aspect of the present invention is a base station apparatus that communicates with a terminal apparatus using a plurality of component carriers, the base station apparatus including: a transmitting section that transmits downlink data using the plurality of component carriers; and a receiving section that receives the response signal in a component carrier indicated by indication information that indicates a component carrier to be used for transmission of a response signal corresponding to downlink data, in which: the plurality of component carriers include a first component carrier and a second component carrier other than the first component carrier, the first component carrier being a component carrier used for transmission of the response signal when downlink data is simultaneously assigned to both the first component carrier and the second component carrier; the indication information is indicated to the terminal apparatus using the second component carrier when downlink data of at least the second component carrier is assigned; and when downlink data is simultaneously assigned to both the first component carrier and the second component carrier, the component carrier indicated by the indication information is the first component carrier.

A transmission method according to an aspect of the present invention is a transmission method for a terminal apparatus that communicates with a base station apparatus using a plurality of component carriers, the transmission method including: generating a response signal using error detection results of downlink data transmitted using the plurality of component carriers; and transmitting the response signal using a component carrier indicated by indication information that indicates a component carrier to be used for transmission of the response signal, in which: the plurality of component carriers include a first component carrier and a second component carrier which is different from the first component carrier, the first component carrier being a component carrier used for transmission of the response signal when downlink data is simultaneously assigned to both the first component carrier and the second component carrier; the indication information is indicated from the base station apparatus using the second component carrier when downlink data of at least the second component carrier is assigned; and when downlink data is simultaneously assigned to both the first component carrier and the second component carrier, the component carrier indicated by the indication information is the first component carrier.

A reception method according to an aspect of the present invention is a reception method for a base station apparatus that communicates with a terminal apparatus using a plurality of component carriers, the reception method including: a transmitting section that transmits downlink data using the plurality of component carriers; and a receiving section that receives the response signal in a component carrier indicated by indication information that indicates a component carrier to be used for transmission of a response signal corresponding to downlink data, in which: the plurality of component carriers include a first component carrier and a second component carrier other than the first component carrier, the first component carrier being a component carrier used for transmission of the response signal when downlink data is simultaneously assigned to both the first component carrier and the second component carrier; the indication information is indicated to the terminal apparatus using the second component carrier when downlink data of at least the second component carrier is assigned; and when downlink data is simultaneously assigned to both the first component carrier and the second component carrier, the component carrier indicated by the indication information is the first component carrier.

Advantageous Effects of Invention

According to the present invention, it is possible to prevent deterioration in detection accuracy of PUCCH by detecting PUCCH in a base station using a single uplink component carrier.

DESCRIPTION OF EMBODIMENTS

Figure 1:
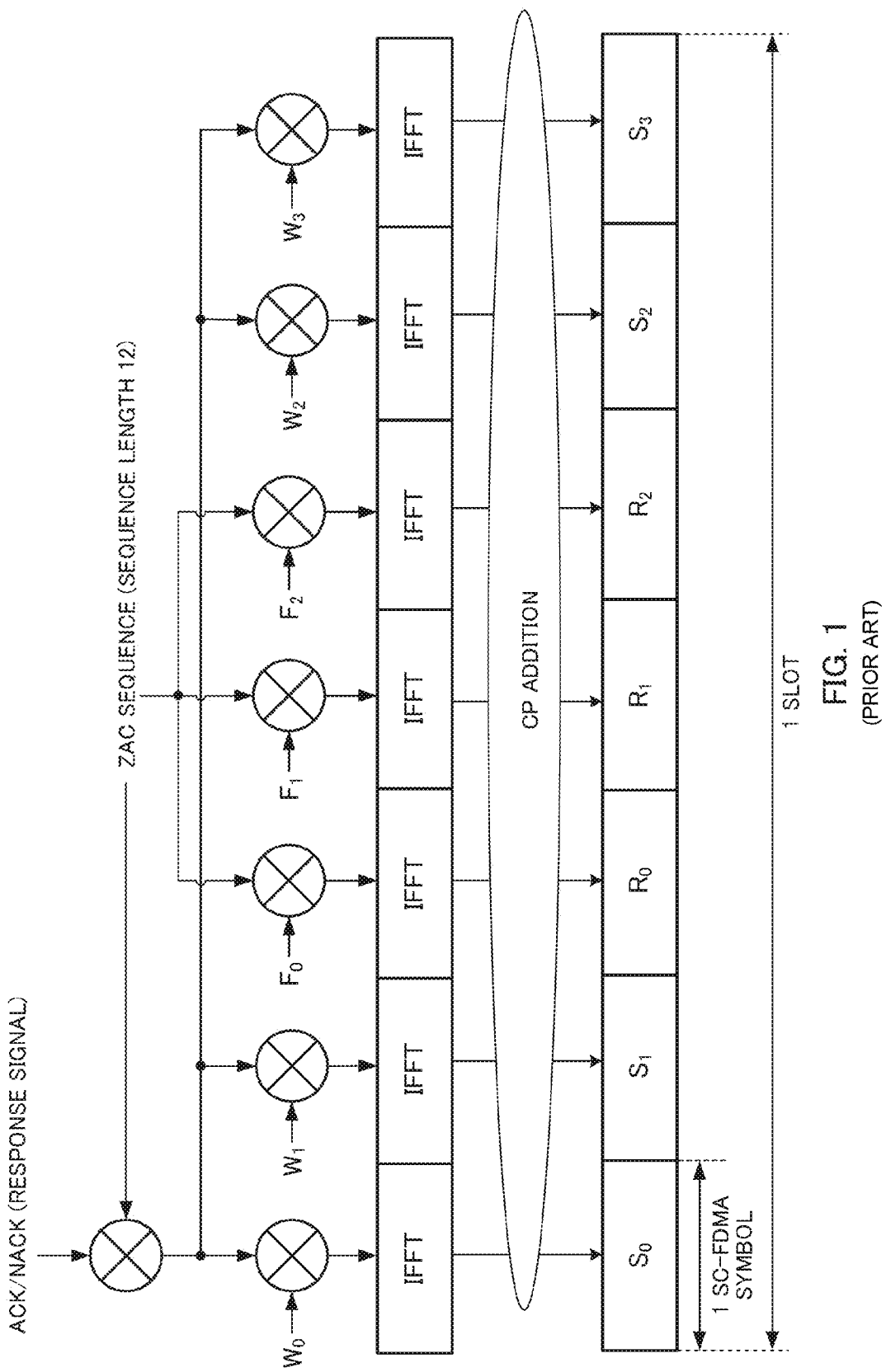
FIG. 1 is a diagram illustrating a method of spreading response signals and reference signals.
Figure 2:
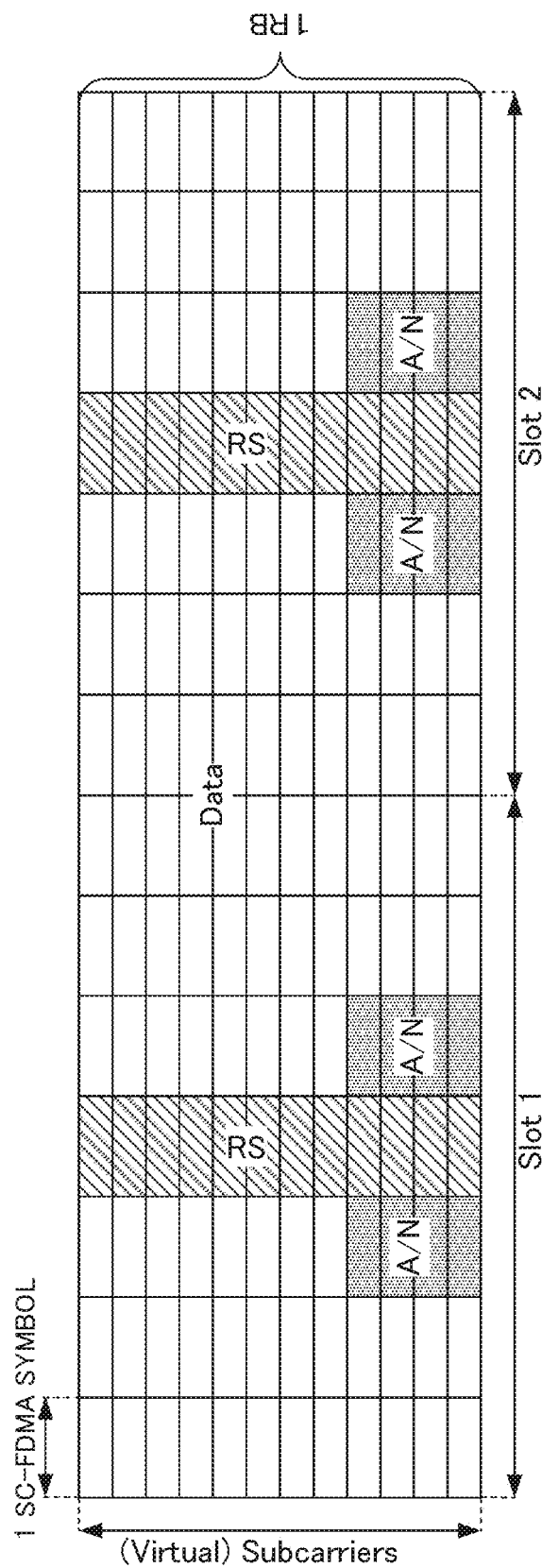
FIG. 2 is a diagram illustrating an operation related to a case where TDM is applied to response signals and uplink data on PUSCH resources.
Figure 3B:
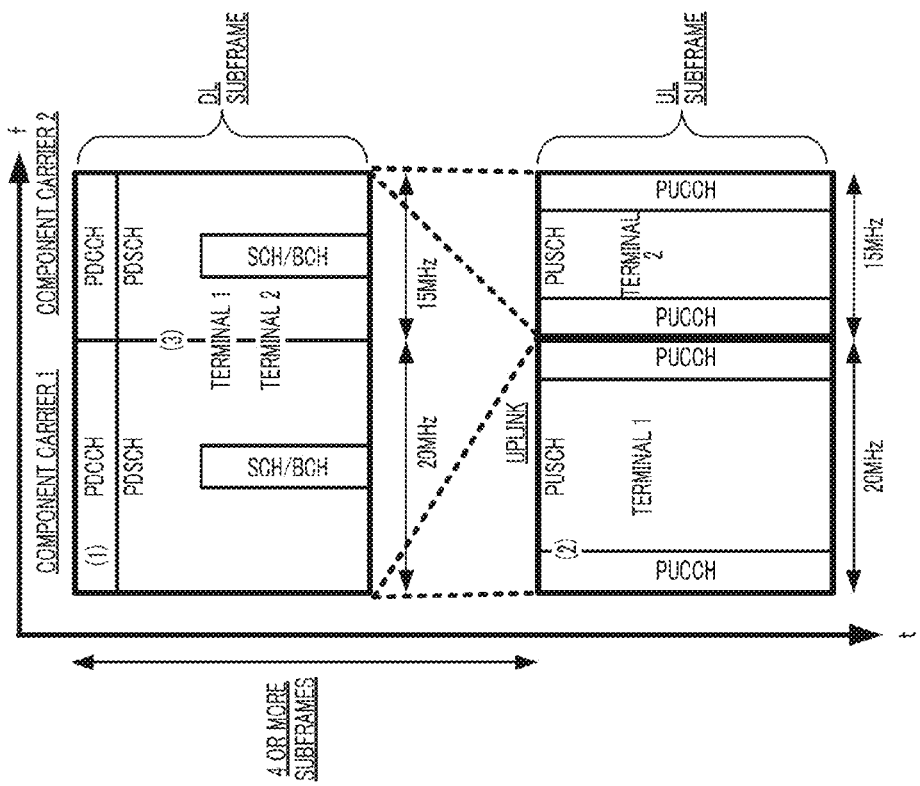
FIGS. 3A and 3B are diagrams provided for describing asymmetric carrier aggregation applied to individual terminals and their control sequence.
Figure 3A:
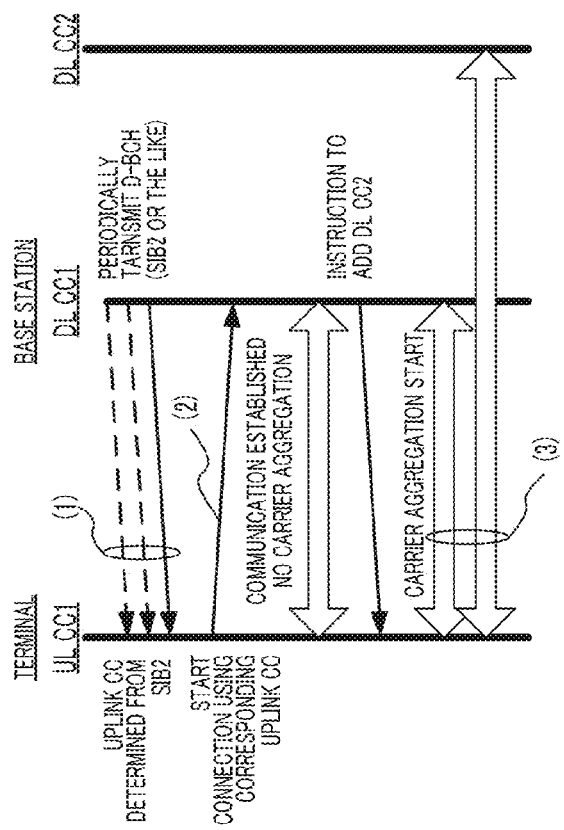
Figure 4:
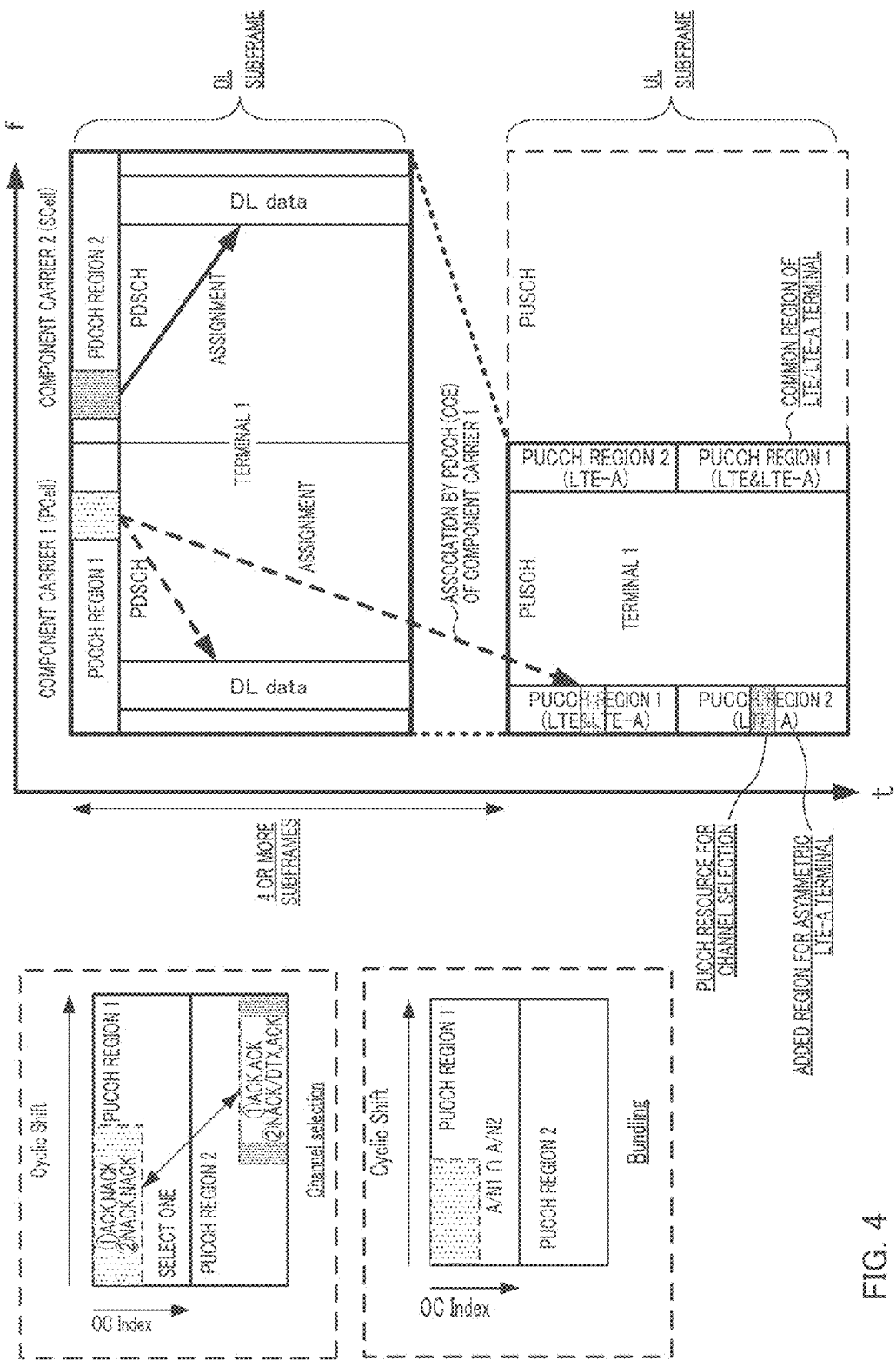
FIG. 4 is a diagram provided for describing Channel Selection.
Figure 5:
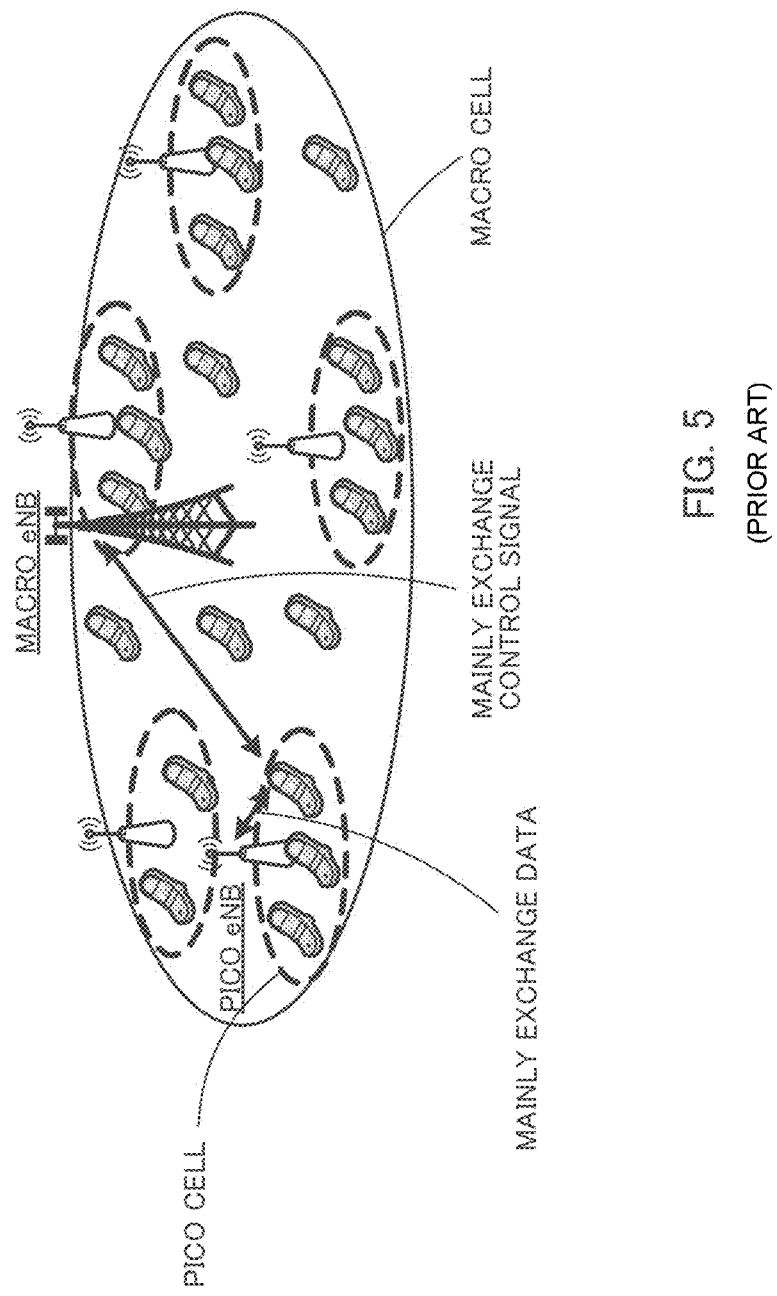
FIG. 5 is a diagram provided for describing Carrier Aggregation in a HetNet environment.
Figure 6:
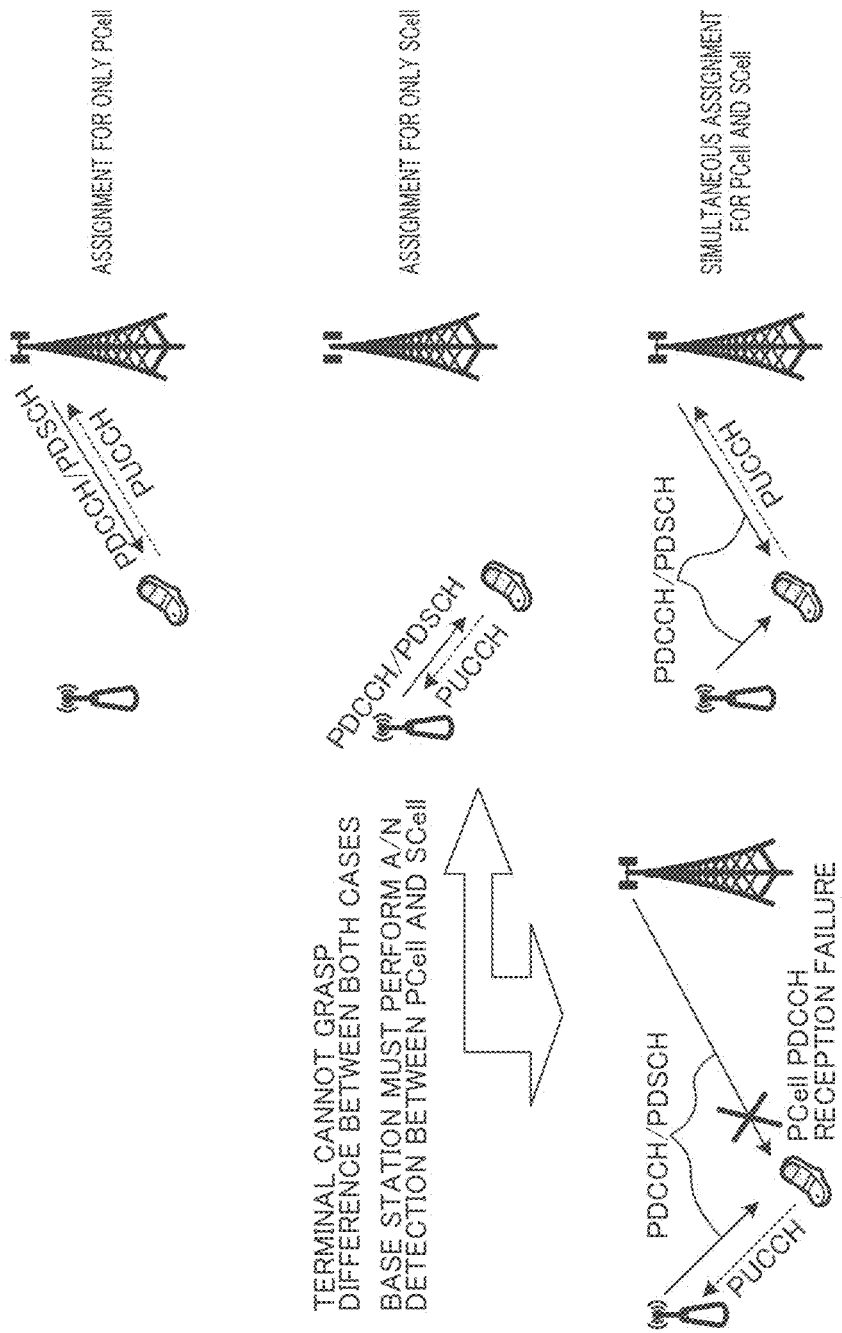
FIG. 6 is a diagram provided for describing PDSCH assignment in each cell.

Hereinafter, embodiments of the claimed invention will be described in detail with reference to the accompanying drawings. Throughout the embodiments, the same elements are assigned the same reference numerals and any duplicate description of the elements is omitted.

(Embodiment 1)

A communication system according to the present embodiment is, for example, an LTE-A system and includes base station 100 and terminal 200. Base station 100 is, for example, a base station compliant with the LTE-A system and terminal 200 is, for example, a terminal compliant with the LTE-A system.

Figure 7:
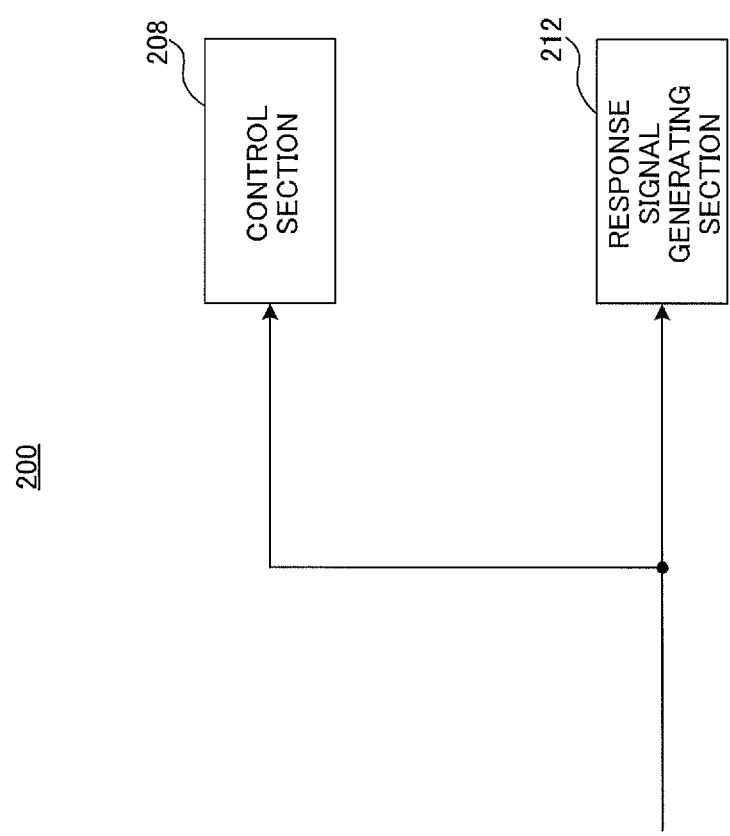
FIG. 7 is a block diagram illustrating a main configuration of a terminal according to Embodiment 1 of the present invention.

FIG. 7 is a block diagram illustrating a main configuration of terminal 200 according to the present embodiment.

Terminal 200 shown in FIG. 7 is a terminal apparatus that communicates with a base station apparatus using a plurality of component carriers. Response signal generating section 212 generates response signals using error detection results of respective pieces of downlink data transmitted by a plurality of component carriers and control section 208 transmits the response signals using indication information indicating a component carrier used for transmission of the response signals (PUCCH transmission cell information). Here, the above-described plurality of component carriers include a first component carrier and a second component carrier which is different from the first component carrier, and when downlink data is simultaneously assigned in the first component carrier and the second component carrier, the first component carrier is a component carrier used for transmission of a response signal, and when downlink data of at least the second component carrier is assigned, the above-described indication information is indicated from base station apparatus 100 using the second component carrier, and when downlink data is simultaneously assigned in both the first component carrier and the second component carrier, the component carrier indicated by the indication information is the first component carrier.

(Configuration of Base Station)

Figure 8:
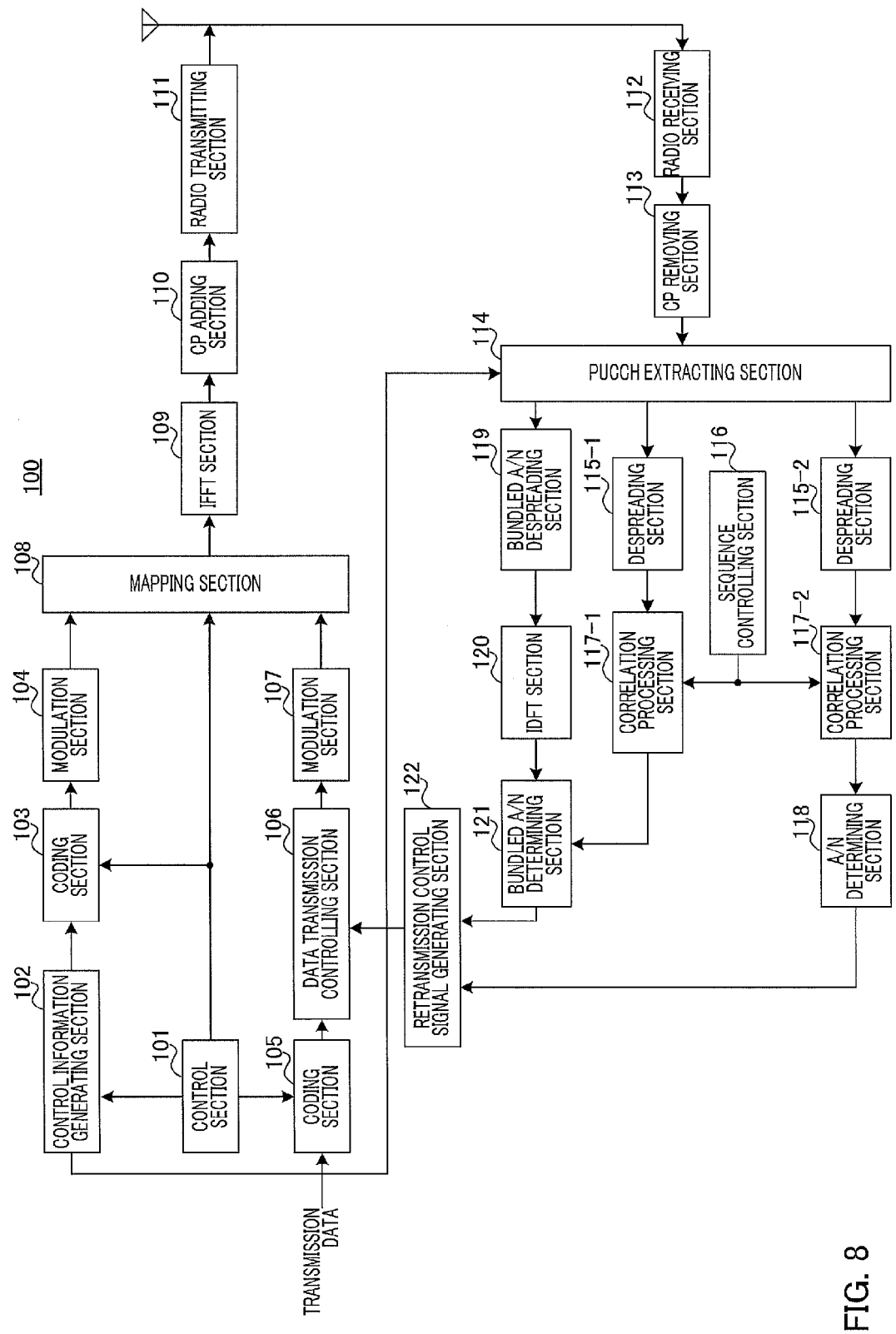
FIG. 8 is a block diagram illustrating a configuration of a base station according to Embodiment 1 of the present invention.

FIG. 8 is a configuration diagram of base station 100 according to Embodiment 1 of the claimed invention. In FIG. 8, base station 100 includes control section 101, control information generating section 102, coding section 103, modulation section 104, coding section 105, data transmission controlling section 106, modulation section 107, mapping section 108, inverse fast Fourier transform (IFFT) section 109, CP adding section 110, radio transmitting section 111, radio receiving section 112, CP removing section 113, PUCCH extracting section 114, despreading section 115, sequence controlling section 116, correlation processing section 117, A/N determining section 118, bundled A/N despreading section 119, inverse discrete Fourier transform (IDFT) section 120, bundled A/N determining section 121 and retransmission control signal generating section 122.

Control section 101 assigns a downlink resource for transmitting control information (i.e., downlink control information assignment resource) and a downlink resource for transmitting downlink data (i.e., downlink data assignment resource) for a resource assignment target terminal (hereinafter, referred to as "destination terminal" or simply "terminal") 200. This resource assignment is performed in a downlink component carrier included in a component carrier group configured for resource assignment target terminal 200. In addition, the downlink control information assignment resource is selected from among the resources corresponding to downlink control channel (i.e., PDCCH) in each downlink component carrier. Moreover, the downlink data assignment resource is selected from among the resources corresponding to downlink data channel (i.e., PDSCH) in each downlink component carrier. In addition, when there are a plurality of resource assignment target terminals 200, control section 101 assigns different resources to resource assignment target terminals 200, respectively.

The downlink control information assignment resources are equivalent to L1/L2 CCH described above. More specifically, the downlink control information assignment resources are each formed of one or a plurality of CCEs.

Control section 101 determines the coding rate used for transmitting control information to resource assignment target terminal 200. The data size of the control information varies depending on the coding rate. Thus, control section 101 assigns a downlink control information assignment resource having the number of CCEs that allows the control information having this data size to be mapped to the resource.

Control section 101 outputs information on the downlink data assignment resource to control information generating section 102. Moreover, control section 101 outputs information on the coding rate to coding section 103. In addition, control section 101 determines and outputs the coding rate of transmission data (i.e., downlink data) to coding section 105. Moreover, control section 101 outputs information on the downlink data assignment resource and downlink control information assignment resource to mapping section 108. However, control section 101 controls the assignment in such a way that the downlink data and downlink control information for the downlink data are mapped to the same downlink component carrier.

Control information generating section 102 generates and outputs control information including the information on the downlink data assignment resource to coding section 103. This control information is generated for each downlink component carrier. In addition, when there are a plurality of resource assignment target terminals 200, the control information includes the terminal ID of each destination terminal 200 in order to distinguish resource assignment target terminals 200 from one another. For example, the control information includes CRC bits masked by the terminal ID of destination terminal 200. This control information may be referred to as "control information carrying downlink assignment" or "downlink control information (DCI)." The above-described control information includes information X indicating which uplink component carrier is to be used to transmit an error detection result on transmission data (downlink data) (PUCCH transmission cell information or information indicating a component carrier to be used for transmission of a response signal). Control information generating section 102 outputs PUCCH transmission cell information X to PUCCH extracting section 114. Details of the PUCCH transmission cell information will be described later.

Coding section 103 encodes the control information using the coding rate received from control section 101 and outputs the coded control information to modulation section 104.

Modulation section 104 modulates the coded control information and outputs the resultant modulation signals to mapping section 108.

Coding section 105 uses the transmission data (i.e., downlink data) for each destination terminal 200 and the coding rate information from control section 101 as input and encodes and outputs the transmission data to data transmission controlling section 106. However, when a plurality of downlink component carriers are assigned to destination terminal 200, coding section 105 encodes each piece of transmission data to be transmitted on a corresponding one of the downlink component carriers and transmits the coded pieces of transmission data to data transmission controlling section 106.

Data transmission controlling section 106 outputs the coded transmission data to modulation section 107 and also keeps the coded transmission data at the initial transmission. The coded transmission data is kept for each destination terminal 200. In addition, data transmission controlling section 106 keeps the transmission data for one destination terminal 200 for each downlink component carrier on which the transmission data is transmitted. Thus, it is possible to perform not only retransmission control for overall data transmitted to destination terminal 200, but also retransmission control for data on each downlink component carrier.

Furthermore, upon reception of a NACK or DTX for downlink data transmitted on a certain downlink component carrier from retransmission control signal generating section 122, data transmission controlling section 106 outputs the data kept in the manner described above and corresponding to this downlink component carrier to modulation section 107. Upon reception of an ACK for the downlink data transmitted on a certain downlink component carrier from retransmission control signal generating section 122, data transmission controlling section 106 deletes the data kept in the manner described above and corresponding to this downlink component carrier.

Modulation section 107 modulates the coded transmission data received from data transmission controlling section 106 and outputs the resultant modulation signals to mapping section 108.

Mapping section 108 maps the modulation signals of the control information received from modulation section 104 to the resource indicated by the downlink control information assignment resource received from control section 101 and outputs the resultant modulation signals to IFFT section 109.

Mapping section 108 maps the modulation signals of the transmission data received from modulation section 107 to the resource (i.e., PDSCH (i.e., downlink data channel)) indicated by the downlink data assignment resource received from control section 101 (i.e., information included in the control information) and outputs the resultant modulation signals to IFFT section 109.

The control information and transmission data mapped to a plurality of subcarriers in a plurality of downlink component carriers in mapping section 108 is transformed into time-domain signals from frequency-domain signals in IFFT section 109, and CP adding section 110 adds a CP to the time-domain signals to form OFDM signals. The OFDM signals undergo transmission processing such as digital to analog (D/A) conversion, amplification and up-conversion and/or the like in radio transmitting section 111 and are transmitted to terminal 200 via an antenna.

Radio receiving section 112 receives, via an antenna, the uplink response signals or reference signals transmitted from terminal 200, and performs reception processing such as down-conversion, A/D conversion and/or the like on the uplink response signals or reference signals.

CP removing section 113 removes the CP added to the uplink response signals or reference signals from the uplink response signals or reference signals that have undergone the reception processing.

PUCCH extracting section 114 extracts, from the PUCCH signals included in the received signals, the signals in the PUCCH region corresponding to the bundled ACK/NACK resource previously indicated to terminal 200 based on PUCCH transmission cell information X inputted from control information generating section 102. The bundled ACK/NACK resource herein refers to a resource used for transmission of the bundled ACK/NACK signals and adopting the DFT-S-OFDM format structure. More specifically, PUCCH extracting section 114 extracts the data part of the PUCCH region corresponding to the bundled ACK/NACK resource (i.e., SC-FDMA symbols on which the bundled ACK/NACK resource is assigned) and the reference signal part of the PUCCH region (i.e., SC-FDMA symbols on which the reference signals for demodulating the bundled ACK/NACK signals are assigned). PUCCH extracting section 114 outputs the extracted data part to bundled A/N despreading section 119 and outputs the reference signal part to despreading section 115-1.

PUCCH extracting section 114 extracts, from the PUCCH signals included in the received signals, on the basis of PUCCH transmission session information input from control information generating section 102, a plurality of PUCCH regions corresponding to an A/N resource associated with a CCE that has been occupied by the PDCCH used for transmission of the downlink assignment control information (DCI), and corresponding to a plurality of A/N resources previously indicated to terminal 200. The A/N resource herein refers to the resource to be used for transmission of an A/N. More specifically, PUCCH extracting section 114 extracts the data part of the PUCCH region corresponding to the A/N resource (i.e., SC-FDMA symbols on which the uplink control signals are assigned) and the reference signal part of the PUCCH region (i.e., SC-FDMA symbols on which the reference signals for demodulating the uplink control signals are assigned). PUCCH extracting section 114 outputs both of the extracted data part and reference signal part to despreading section 115-2. In this manner, the response signals are received on the resource selected from the PUCCH resource associated with the CCE and the specific PUCCH resource previously indicated to terminal 200.

Sequence controlling section 116 generates a base sequence that may be used for spreading each of the A/N reported from terminal 200, the reference signals for the A/N, and the reference signals for the bundled ACK/NACK signals (i.e., length-12 ZAC sequence). In addition, sequence controlling section 116 identifies a correlation window corresponding to a resource on which the reference signals may be assigned (hereinafter, referred to as "reference signal resource") in PUCCH resources that may be used by terminal 200. Sequence controlling section 116 outputs the information indicating the correlation window corresponding to the reference signal resource on which the reference signals may be assigned in bundled ACK/NACK resources and the base sequence to correlation processing section 117-1. Sequence controlling section 116 outputs the information indicating the correlation window corresponding to the reference signal resource and the base sequence to correlation processing section 117-1. In addition, sequence controlling section 116 outputs the information indicating the correlation window corresponding to the A/N resources on which an A/N and the reference signals for the A/N are assigned and the base sequence to correlation processing section 117-2.

Despreading section 115-1 and correlation processing section 117-1 perform processing on the reference signals extracted from the PUCCH region corresponding to the bundled ACK/NACK resource.

More specifically, despreading section 115-1 despreads the reference signal part using a Walsh sequence to be used in secondary-spreading for the reference signals of the bundled ACK/NACK resource by terminal 200 and outputs the despread signals to correlation processing section 117-1.

Correlation processing section 117-1 uses the information indicating the correlation window corresponding to the reference signal resource and the base sequence and thereby finds a correlation value between the signals received from despreading section 115-1 and the base sequence that may be used in primary-spreading in terminal 200. Correlation processing section 117-1 outputs the correlation value to bundled A/N determining section 121.

Despreading section 115-2 and correlation processing section 117-2 perform processing on the reference signals and A/Ns extracted from the plurality of PUCCH regions corresponding to the plurality of A/N resources.

To put it more specifically, despreading section 115-2 despreads the data part and reference signal part using a Walsh sequence and a DFT sequence to be used in secondary-spreading for the data part and reference signal part of each of the A/N resources by terminal 200, and outputs the despread signals to correlation processing section 117-2.

Correlation processing section 117-2 uses the information indicating the correlation window corresponding to each of the A/N resources and the base sequence and thereby finds a correlation value between the signals received from despreading section 115-2 and a base sequence that may be used in primary-spreading by terminal 200. Correlation processing section 117-2 outputs each correlation value to A/N determining section 118.

A/N determining section 118 determines, on the basis of the plurality of correlation values received from correlation processing section 117-2, which of the A/N resources is used to transmit the signals from terminal 200 or none of the A/N resources is used. When determining that the signals are transmitted using one of the A/N resources from terminal 200, A/N determining section 118 performs coherent detection using a component corresponding to the reference signals and a component corresponding to the A/N and outputs the result of coherent detection to retransmission control signal generating section 122. Meanwhile, when determining that terminal 200 uses none of the A/N resources, A/N determining section 118 outputs the determination result indicating that none of the A/N resources is used to retransmission control signal generating section 122.

Bundled A/N despreading section 119 despreads, using a DFT sequence, the bundled ACK/NACK signals corresponding to the data part of the bundled ACK/NACK resource received from PUCCH extracting section 114 and outputs the despread signals to IDFT section 120.

IDFT section 120 transforms the bundled ACK/NACK signals in the frequency-domain received from bundled A/N despreading section 119 into time-domain signals by IDFT processing and outputs the bundled ACK/NACK signals in the time-domain to bundled A/N determining section 121.

Bundled A/N determining section 121 demodulates the bundled ACK/NACK signals corresponding to the data part of the bundled ACK/NACK resource received from IDFT section 120, using the reference signal information on the bundled ACK/NACK signals that is received from correlation processing section 117-1. In addition, bundled A/N determination section 121 decodes the demodulated bundled ACK/NACK signals and outputs the result of decoding to retransmission control signal generating section 122 as the bundled A/N information. However, when the correlation value received from correlation processing section 117-1 is smaller than a threshold, and bundled A/N determining section 121 thus determines that terminal 200 does not use any bundled A/N resource to transmit the signals, bundled A/N determining section 121 outputs the result of determination to retransmission control signal generating section 122.

Retransmission control signal generating section 122 determines whether or not to retransmit the data transmitted on the downlink component carrier (i.e., downlink data) on the basis of the information inputted from bundled A/N determining section 121 and the information inputted from A/N determining section 118 and generates retransmission control signals based on the result of determination. More specifically, when determining that downlink data transmitted on a certain downlink component carrier needs to be retransmitted, retransmission control signal generating section 122 generates retransmission control signals indicating a retransmission command for the downlink data and outputs the retransmission control signals to data transmission controlling section 106. In addition, when determining that the downlink data transmitted on a certain downlink component carrier does not need to be retransmitted, retransmission control signal generating section 122 generates retransmission control signals indicating not to retransmit the downlink data transmitted on the downlink component carrier and outputs the retransmission control signals to data transmission controlling section 106.

(Configuration of Terminal)

Figure 9:
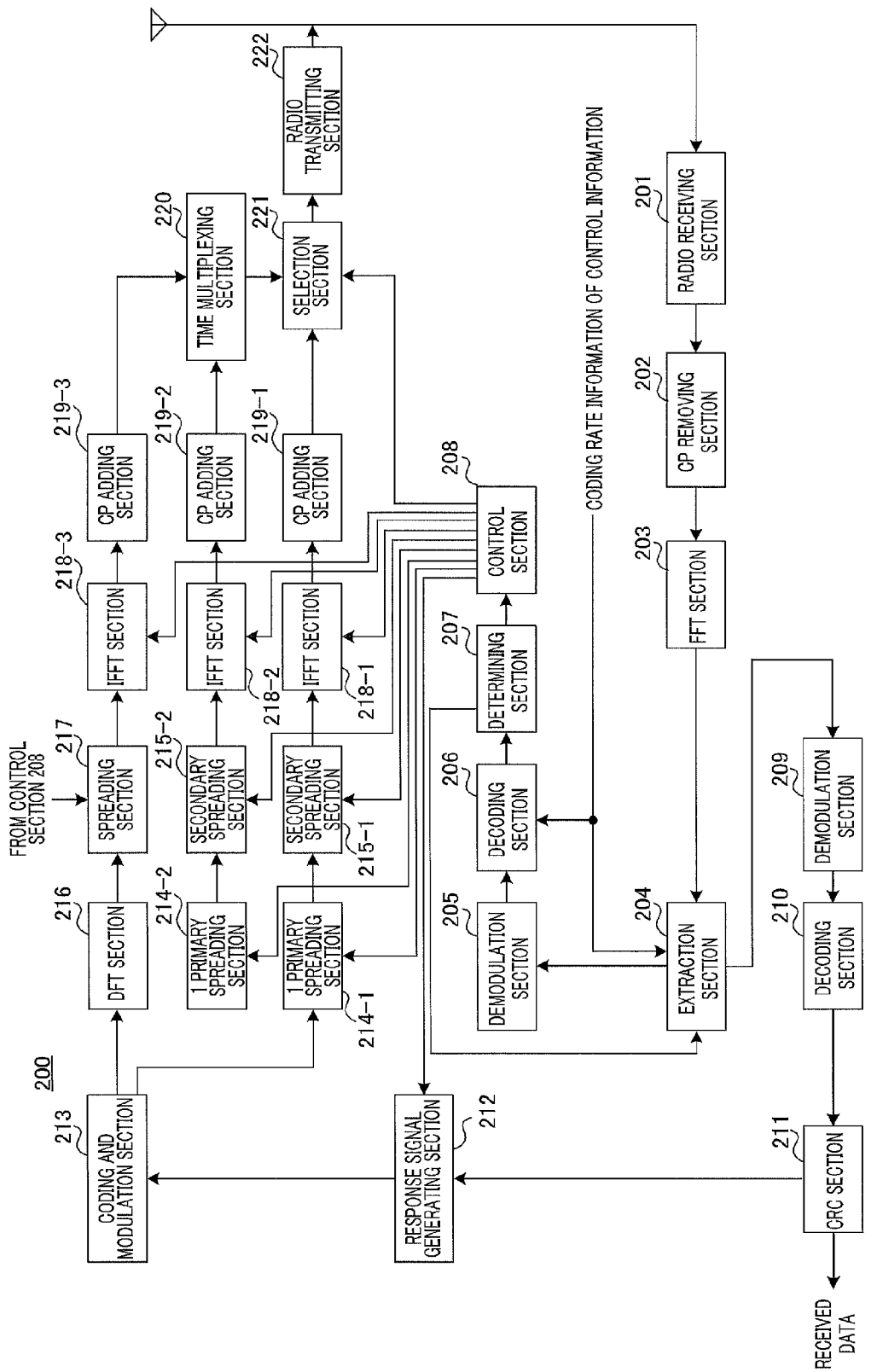
FIG. 9 is a block diagram illustrating a configuration of the terminal according to Embodiment 1 of the present invention.

FIG. 9 is a block diagram illustrating a configuration of terminal 200 according to Embodiment 1. In FIG. 9, terminal 200 includes radio receiving section 201, CP removing section 202, fast Fourier transform (FFT) section 203, extraction section 204, demodulation section 205, decoding section 206, determination section 207, control section 208, demodulation section 209, decoding section 210, CRC section 211, response signal generating section 212, coding and modulation section 213, primary-spreading sections 214-1 and 214-2, secondary-spreading sections 215-1 and 215-2, DFT section 216, spreading section 217, IFFT sections 218-1, 218-2 and 218-3, CP adding sections 219-1, 219-2 and 219-3, time-multiplexing section 220, selection section 221 and radio transmitting section 222

Radio receiving section 201 receives, via an antenna, OFDM signals transmitted from base station 100 and performs reception processing such as down-conversion, A/D conversion and/or the like on the received OFDM signals. It should be noted that, the received OFDM signals include PDSCH signals assigned to a resource in a PDSCH (i.e., downlink data), or PDCCH signals assigned to a resource in a PDCCH.

CP removing section 202 removes a CP that has been added to the OFDM signals from the OFDM signals that have undergone the reception processing.

FFT section 203 transforms the received OFDM signals into frequency-domain signals by FFT processing and outputs the resultant received signals to extraction section 204.

Extraction section 204 extracts, from the received signals to be received from FFT section 203, downlink control channel signals (i.e., PDCCH signals) in accordance with coding rate information to be received. More specifically, the number of CCEs (or R-CCEs) forming a downlink control information assignment resource varies depending on the coding rate. Thus, extraction section 204 uses the number of CCEs that corresponds to the coding rate as units of extraction processing, and extracts downlink control channel signals. In addition, the downlink control channel signals are extracted for each downlink component carrier. The extracted downlink control channel signals are outputted to demodulation section 205.

Extraction section 204 extracts downlink data (i.e., downlink data channel signals (i.e., PDSCH signals)) from the received signals on the basis of information on the downlink data assignment resource intended for terminal 200 to be received from determination section 207 to be described, hereinafter, and outputs the downlink data to demodulation section 209. As described above, extraction section 204 receives the downlink assignment control information (i.e., DCI) mapped to the PDCCH and receives the downlink data on the PDSCH.

Demodulation section 205 demodulates the downlink control channel signals received from extraction section 204 and outputs the obtained result of demodulation to decoding section 206.

Decoding section 206 decodes the result of demodulation received from demodulation section 205 in accordance with the received coding rate information and outputs the obtained result of decoding to determination section 207.

Determination section 207 performs blind-determination (i.e., monitoring) to find out whether or not the control information included in the result of decoding received from decoding section 206 is the control information intended for terminal 200. This determination is made in units of decoding results corresponding to the units of extraction processing. For example, determination section 207 demasks the CRC bits by the terminal ID of terminal 200 and determines that the control information resulted in CRC=OK (no error) as the control information intended for terminal 200. Determination section 207 outputs information on the downlink data assignment resource intended for terminal 200, which is included in the control information intended for terminal 200, to extraction section 204.

In addition, when detecting the control information (i.e., downlink assignment control information) intended for terminal 200, determination section 207 informs control section 208 that ACK/NACK signals will be generated (or are present). Moreover, when detecting the control information intended for terminal 200 from PDCCH signals, determination section 207 outputs information on a CCE that has been occupied by the PDCCH to control section 208.

Upon detecting control information intended for terminal 200 (i.e., downlink assignment control information), determining section 207 outputs PUCCH transmission cell information X included in the control information to control section 208.

Control section 208 identifies the A/N resource associated with the CCE on the basis of the information on the CCE received from determination section 207. Control section 208 outputs, to primary-spreading section 214-1, a base sequence and a cyclic shift value corresponding to the A/N resource associated with the CCE or the A/N resource previously indicated by base station 100, and also outputs a Walsh sequence and a DFT sequence corresponding to the A/N resource to secondary-spreading section 215-1. In addition, control section 208 outputs the frequency resource information on the A/N resource to IFFT section 218-1.

When determining to transmit bundled ACK/NACK signals using a bundled ACK/NACK resource, control section 208 outputs the base sequence and cyclic shift value corresponding to the reference signal part (i.e., reference signal resource) of the bundled ACK/NACK resource previously indicated by base station 100 to primary-despreading section 214-2 and outputs a Walsh sequence to secondary-despreading section 215-2. In addition, control section 208 outputs the frequency resource information on the bundled ACK/NACK resource to IFFT section 218-2.

Control section 208 outputs a DFT sequence used for spreading the data part of the bundled ACK/NACK resource to spreading section 217 and outputs the frequency resource information on the bundled ACK/NACK resource to IFFT section 218-3.

Control section 208 selects the bundled ACK/NACK resource or the A/N resource and instructs selection section 221 to output the selected resource to radio transmitting section 222. Moreover, control section 208 instructs response signal generating section 212 to generate the bundled ACK/NACK signals or the ACK/NACK signals in accordance with the selected resource.

Control section 208 outputs information on an uplink component carrier that transmits PUCCH to response signal generating section 212 and selection section 221 based on the presence or absence of PUCCH transmission cell information X inputted from determining section 207 and PUCCH transmission cell information X. Thus, the response signal is transmitted on the uplink component carrier indicated by PUCCH transmission cell information X. Details of PUCCH transmission cell information X will be described later.

Demodulation section 209 demodulates the downlink data received from extraction section 204 and outputs the demodulated downlink data to decoding section 210.

Decoding section 210 decodes the downlink data received from demodulation section 209 and outputs the decoded downlink data to CRC section 211.

CRC section 211 performs error detection on the decoded downlink data received from decoding section 210, for each downlink component carrier using CRC and outputs an ACK when CRC=OK (no error) or outputs a NACK when CRC=Not OK (error) to response signal generating section 212. Moreover, CRC section 211 outputs the decoded downlink data as the received data when CRC=OK (no error).

Response signal generating section 212 generates response signals on the basis of the reception situation of downlink data (i.e., result of error detection on downlink data) on each downlink component carrier inputted from CRC section 211, information on the uplink component carrier that transmits PUCCH inputted from control section 208 and information indicating the previously set group number. More specifically, when instructed to generate the bundled ACK/NACK signals from control section 208, response signal generating section 212 generates the bundled ACK/NACK signals including the results of error detection for the respective component carriers as individual pieces of data. Meanwhile, when instructed to generate ACK/NACK signals from control section 208, response signal generating section 212 generates ACK/NACK signals of one symbol. Response signal generating section 212 outputs the generated response signals to coding and modulation section 213.

Upon reception of the bundled ACK/NACK signals, coding and modulation section 213 encodes and modulates the received bundled ACK/NACK signals to generate the modulation signals of 12 symbols and outputs the modulation signals to DFT section 216. In addition, upon reception of the ACK/NACK signals of one symbol, coding and modulation section 213 modulates the ACKINACK signals and outputs the modulation signals to primary-spreading section 214-1.

Primary-spreading sections 214-1 and 214-2 corresponding to the A/N resources and reference signal resources of the bundled ACK/NACK resources spread the ACK/NACK signals or reference signals using the base sequence corresponding to the resources in accordance with the instruction from control section 208 and output the spread signals to secondary-spreading sections 215-1 and 215-2.

Secondary-spreading sections 215-1 and 215-2 spread the received primary-spread signals using a Walsh sequence or a DFT sequence in accordance with an instruction from control section 208 and outputs the spread signals to IFFT sections 218-1 and 218-2.

DFT section 216 performs DFT processing on 12 time-series sets of received bundled ACK/NACK signals to obtain 12 signal components in the frequency-domain. DFT section 216 outputs the 12 signal components to spreading section 217.

Spreading section 217 spreads the 12 signal components received from DFT section 216 using a DFT sequence indicated by control section 208 and outputs the spread signal components to IFFT section 218-3.

IFFT sections 218-1, 218-2 and 218-3 perform IFFT processing on the received signals in association with the frequency positions where the signals are to be allocated, in accordance with an instruction from control section 208. Accordingly, the signals inputted to IFFT sections 218-1, 218-2 and 218-3 (i.e., ACK/NACK signals, the reference signals of A/N resource, the reference signals of bundled ACK/NACK resource and bundled ACK/NACK signals) are transformed into time-domain signals.

CP adding sections 219-1, 219-2 and 219-3 add the same signals as the last part of the signals obtained by IFFT processing to the beginning of the signals as a CP.

Time-multiplexing section 220 time-multiplexes the bundled ACK/NACK signals received from CP adding section 219-3 (i.e., signals transmitted using the data part of the bundled ACK/NACK resource) and the reference signals of the bundled ACK/NACK resource to be received from CP adding section 219-2 on the bundled ACK/NACK resource and outputs the multiplexed signals to selection section 221.

Selection section 221 selects one of the bundled ACK/NACK resource received from time-multiplexing section 220 and the A/N resource received from CP adding section 219-1 and an uplink component carrier that transmits a PUCCH (response signal) according to an instruction of control section 208 and outputs the selected resource and the signal assigned to the uplink component carrier to radio transmitting section 222.

Radio transmitting section 222 performs transmission processing such as D/A conversion, amplification and up-conversion and/or the like on the signals received from selection section 221 and transmits the resultant signals to base station 100 via an antenna.

[Operations of Base Station 100 and Terminal 200]

Operations of base station 100 and terminal 200 having the above-described configurations will be described.

The following description assumes that the number of downlink component carriers configured in terminal 200 is two: PCell (here, the cell covered by macro eNB) and SCell (here, the cell covered by pico eNB). When PDSCHs are simultaneously assigned in both PCell and SCell, a PCell PUCCH is configured as the PUCCH that transmits ACK/NACK corresponding to the PDSCH.

Base station 100 previously configures in terminal 200 whether or not to indicate PUCCH transmission cell information X using SCell. For example, when at least an SCell PDSCH is assigned to terminal 200, base station 100 indicates PUCCH transmission cell information X using SCell. In other words, base station 100 does not indicate PUCCH transmission cell information X using PCell.

That is, in the following description, PCell can be said to be a cell (CC) used for transmission of ACK/NACK when PDSCHs are simultaneously assigned in both PCell and SCell or a cell not used to indicate PUCCH transmission information X. On the other hand, SCell can be said to be a cell (CC) not used for transmission of ACK/NACK when PDSCHs are simultaneously assigned in both PCell and SCell or a cell used to indicate PUCCH transmission information X.

PUCCH transmission cell information X is 1-bit information. For example, an arrangement may be made beforehand between base station 100 and terminal 200 such that X=0 indicates PCell (or UL PCC) and X=1 indicates SCell (or UL SCC).

Hereinafter, operations of base station 100 and terminal 200 when PUCCH transmission cell information X is indicated using SCell will be described in detail.

<When only PCell PDS CH is assigned (top in FIG. 10)>

When only a PCell PDSCH is assigned, base station 100 does not indicate PUCCH transmission cell information X to terminal 200. Base station 100 identifies PCell as a CC to be used for transmission of ACK/NACK for a PCell PDSCH. That is, base station 100 expects to receive PUCCH on PCell.

On the other hand, since terminal 200 receives only PDCCH (DL assignment) indicating the PCell PDSCH, terminal 200 transmits ACK/NACK to the PDSCH indicated by the PDCCH using the PCell PUCCH.

<When only SCell PDSCH is assigned (middle in FIG. 10)>

When only an SCell PDSCH is assigned, base station 100 indicates PUCCH transmission cell information X using PDCCH (DL assignment) indicating the SCell PDSCH. Here, PUCCH transmission cell information X indicates SCell. Base station 100 expects to receive PUCCH on an uplink component carrier indicated by PUCCH transmission cell information X.

On the other hand, terminal 200 receives only PDCCH (DL assignment) indicating the SCell PDSCH. Terminal 200 acquires PUCCH transmission cell information X on the PDCCH and identifies SCell indicated by X as a PUCCH transmission cell. That is, terminal 200 (control section 208) transmits ACK/NACK corresponding to the SCell PDSCH using the uplink component carrier (SCell in FIG. 10) indicated by PUCCH transmission cell information X.

<When PDSCHs of both PCell and SCell are simultaneously assigned (bottom in FIG. 10)>

When PDSCHs are simultaneously assigned in PCell and SCell, base station 100 indicates PUCCH transmission cell information X using PDCCH (DL assignment) indicating an SCell PDSCH. Here, PCell is always indicated as PUCCH transmission cell information X (X=PCell). Base station 100 expects to receive PUCCH using the PCell indicated by PUCCH transmission cell info' nation X.

On the other hand, upon successfully receiving PDCCH (DL assignment) indicating at least an SCell PDSCH, terminal 200 also acquires PUCCH transmission cell information X, and so identifies that X indicates PCell. Thus, terminal 200 transmits ACK/NACK corresponding to the received PDSCH using a PCell PUCCH according to an instruction of PUCCH transmission cell information X.

Figure 10:
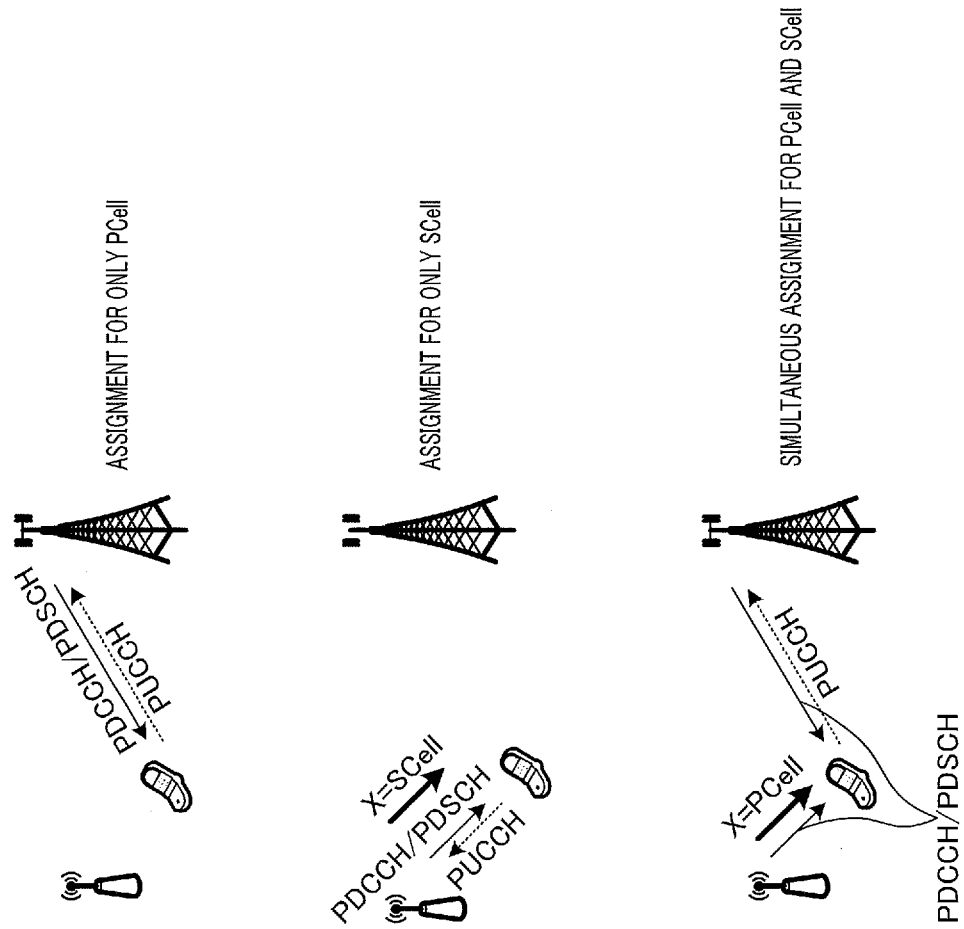
FIG. 10 is a diagram provided for describing PDSCH assignment in each cell according to Embodiment 1 of the present invention.

On the other hand, upon successfully receiving only PDCCH (DL assignment) indicating a PCell PDSCH, terminal 200 transmits ACK/NACK corresponding to the PDSCH using a PCell PUCCH in the same way as in the case where base station 100 assigns only the PCell PDSCH (top in FIG. 10).

That is, upon receiving a PDCCH corresponding to at least the PCell PDSCH (top and bottom in FIG. 10), terminal 200 transmits ACK/NACK using PCell, and upon receiving only a PDCCH corresponding to the SCell PDSCH (middle in FIG. 10), terminal 200 transmits ACK/NACK using an uplink component carrier (PCell or SCell) indicated by PUCCH transmission cell information X.

Operations of base station 100 and terminal 200 when indicating PUCCH transmission cell information X using SCell have been described so far.

Thus, base station 100 does not indicate PUCCH transmission cell information X using a PDCCH indicating the PCell PDSCH but indicates PUCCH transmission cell information X using a PDCCH indicating the SCell PDSCH. When PDSCHs are simultaneously assigned in PCell and SCell, the uplink component carrier indicated by PUCCH transmission cell information X is always PCell (CC that does not indicate PUCCH transmission cell information X).

Thus, for example, when PDSCHs are simultaneously assigned in PCell and SCell, even when terminal 200 fails to receive a PDCCH indicating a PDSCH of a component carrier for transmission of a response signal (PCell in FIG. 10), terminal 200 can transmit ACK/NACK appropriately using a PUCCH transmission cell (PCell) according to an instruction of PUCCH transmission cell information X indicated using SCell.

More specifically, even when terminal 200 fails to receive a PDCCH indicating a PCell PDSCH "when PDSCHs are simultaneously assigned in PCell and SCell" shown at the bottom in FIG. 10, terminal 200 can transmit ACK/NACK using PCell without transmitting ACK/NACK using SCell as "when only an SCell PDSCH is assigned" shown in the middle in FIG. 10. That is, it is possible to prevent the cell from which base station 100 expects to receive a PUCCH from being different from the cell whereby terminal 200 actually transmits the PUCCH.

In this way, base station 100 will no longer need to detect PUCCH using a plurality of uplink component carriers (PCell and SCell) in preparation for a case where terminal 200 fails to receive a PDCCH. That is, base station 100 needs only to detect a PUCCH using only a single uplink component carrier whereby base station 100 expects to receive a PUCCH in accordance with PDSCH assignment of the downlink component carrier to terminal 200 as described above. By so doing, it is possible to prevent deterioration in detection accuracy of PUCCH in base station 100.

Furthermore, in FIG. 10, when PDSCHs are simultaneously assigned in PCell and SCell, ACK/NACK transmission (PUCCH transmission) is always performed in PCell. On the other hand, in FIG. 10, when a PDSCH is assigned in only SCell, PUCCH transmission is performed in SCell.

When PUCCH transmission cell information X indicates PCell, terminal 200 (response signal generating section 212) generates ACK/NACKs corresponding to PDSCHs of both PCell and SCell, and when PUCCH transmission cell information X indicates SCell, terminal 200 generates ACK/NACKs corresponding to only an SCell PDSCH. That is, when PUCCH transmission cell information X indicates SCell, terminal 200 generates ACK/NACKs using error detection results corresponding to PDSCH of a number of component carriers less than the total number (2 in FIG. 10) of a plurality of component carriers configured in terminal 200.

For this reason, ACK/NACKs corresponding to a maximum number (2) of downlink component carriers configured in terminal 200 are transmitted using a PCell PUCCH and ACK/NACKs corresponding to the number (1) of downlink component carriers that indicate PUCCH transmission cell information X are transmitted using an SCell PUCCH.

That is, for the SCell PUCCH, it is not necessary to assume ACK/NACK transmission corresponding to the number (2) of downlink component carriers configured in terminal 200, and it is only necessary to perform ACK/NACK transmission optimized for the number (1) of downlink component carriers less than the total number of downlink component carriers configured in terminal 200.

That is, when PUCCH transmission cell information X indicates PCell, terminal 200 (control section 208) transmits ACK/NACKs using an ACK/NACK transmission method (PUCCH transmission method) optimized for the number of downlink component carriers configured in terminal 200. On the other hand, when PUCCH transmission cell information X indicates SCell, terminal 200 transmits ACK/NACKs using an ACK/NACK transmission method different from the above-described ACK/NACK transmission method.

Terminal 200 performs ACK/NACK transmission optimized for a smaller number of downlink component carriers, and can thereby reduce a required average SNR of PUCCHs to satisfy required receiving quality of base station 100. The effect resulting from the optimization of the ACK/NACK transmission method is a special effect in the present embodiment which is different from a reduction of transmission power and a reduction of interference attributable to the switching of PUCCH transmission to pico eNB located at a shorter distance.

Thus, PUCCH transmission cell information X not only indicates a PUCCH transmission cell (uplink component carrier) but also indicates a maximum number of downlink component carriers, PDSCH error detection results of which are to be indicated. That is, PUCCH transmission cell information X also indicates an ACK/NACK transmission method.

An example of switching between the ACK/NACK transmission methods when Channel Selection is configured will be described with reference to FIG. 11 and FIG. 12.

Cases will be described below where CIF (Cross Indicator Field) is not configured (non-CIF) and where CIF is configured (CIF) respectively. Here, when CIF is not configured, a PCell PDSCH is indicated using a PCell PDCCH and an SCell PDSCH is indicated using an SCell PDCCH. In contrast, when CIF is configured, both the PCell PDSCH and SCell PDSCH are indicated using the PCell PDCCH.

The TPC field (2 bits) included in each PDCCH may be used as a TPC command of a PUCCH or may be used as an ARI (indication of a PUCCH resource).

<When CIF is not configured or when CIF is configured and when a PCell PDSCH is assigned>

Base station 100 assumes the TPC field (2 bits) to be a PUCCH TPC command in a PDCCH indicating a PCell PDSCH irrespective of the presence or absence of the CIF configuration. Terminal 200 identifies a PUCCH resource (PUCCH resource 0 in FIG. 12) associated with the top CCE index $n_{CCE}$ occupied by the received PCell PDCCH as a transmission resource of ACK/NACK.

When only a PCell PDSCH is assigned, that is, when no SCell PDSCH is assigned, terminal 200 transmits ACK/NACK corresponding to the PCell PDSCH using a PUCCH resource in PCell associated with the aforementioned top CCE index $n_{CCE}$. In this case, when the PDCCH indicating the PCell PDSCH indicates non-MIMO reception (when the number of bits of ACK/NACK is one), ACK/NACK is BPSK-mapped. On the other hand, when a PDCCH that indicates a PCell PDSCH indicates MIMO reception (when the number of bits of ACK/NACK is two), ACK/NACK is QPSK-mapped.

When the PDCCH that indicates a PCell PDSCH indicates MIMO reception or when there is SCell PDSCH assignment, terminal 200 further identifies a PUCCH resource in PCell (PUCCH resource 1 in FIG. 12) associated with $n_{CCE}+1$ adjacent to the top CCE index $n_{CCE}$ as a transmission resource of ACK/NACK.

When CA (Carrier Aggregation) is not configured, base station 100 assumes the TPC field (2 bits) to be a TPC command of a PUCCH in the PDCCH that indicates a PCell PDSCH. Terminal 200 identifies a PUCCH resource in PCell associated with the top CCE index $n_{CCE}$ occupied by the PCell PDCCH as a transmission resource of ACK/NACK. By so doing, when CA is not configured and when CA is configured and only a PCell PDSCH is assigned, terminal 200 can transmit ACK/NACKs using the same uplink component carrier, the same PUCCH resource and the same ACK/NACK mapping. This makes it possible to prevent operation inconsistency (Uncertainty) at timing at which there is a difference in recognition of configuration between base station 100 and terminal 200 in the middle of reconfiguration from CA non-configuration to CA configuration or reconfiguration from CA configuration to CA non-configuration (hereinafter, this may be expressed as "LTE fallback can be supported").

<When CIF is not configured, when SCell PDSCH is assigned and X=PCell>

When CIF is not configured, base station 100 indicates PCell as PUCCH transmission cell information X in a PDCCH that indicates an SCell PDSCH. In this case, base station 100 assumes the TPC field (2 bits) to be an ARI (e.g., at the bottom left in FIG. 11).

Figure 12:
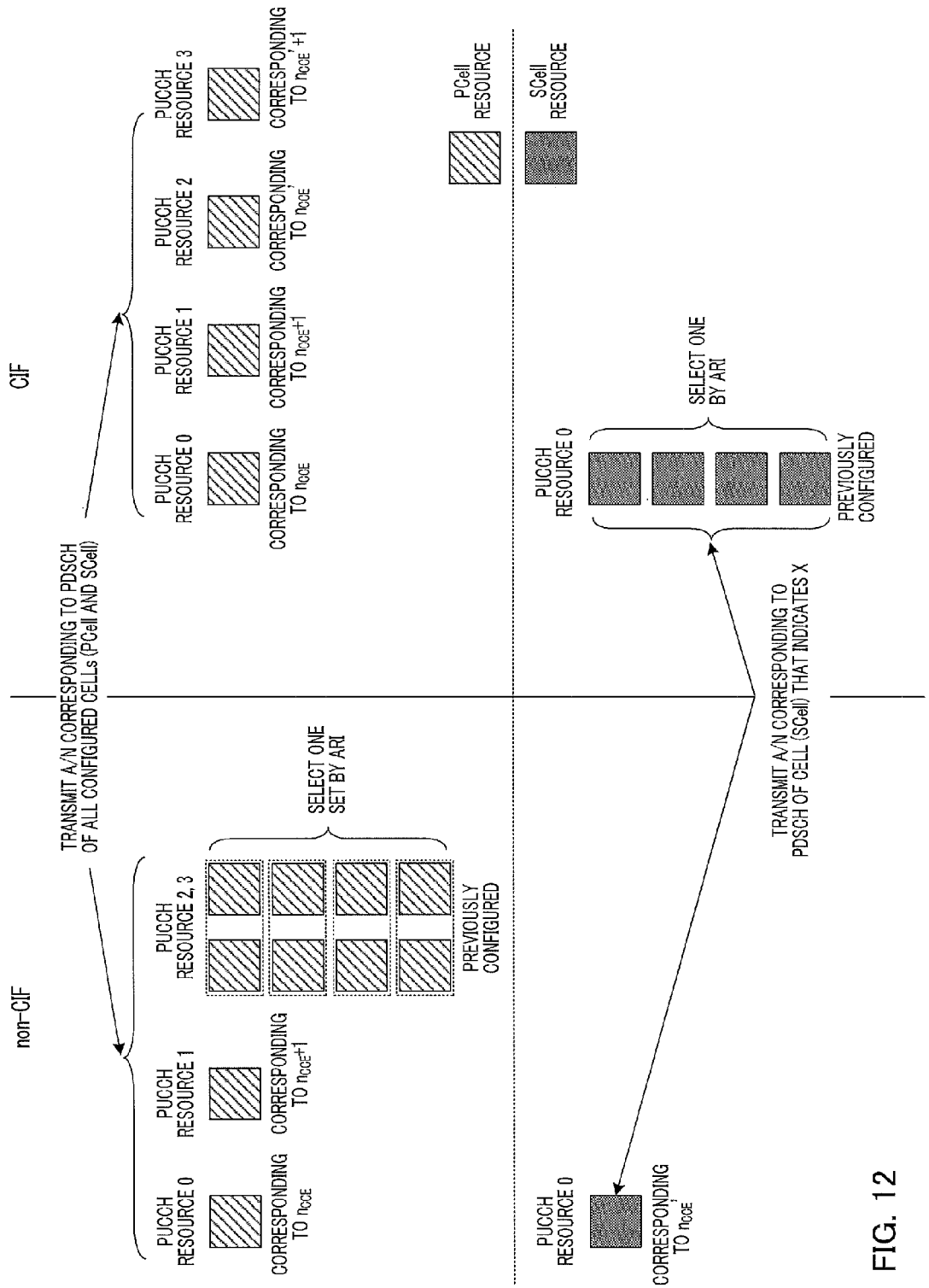
FIG. 12 is a diagram provided for describing PUCCH resources according to Embodiment 1 of the present invention.

When a transmission mode supporting only a maximum one-CW (codeword) transmission is configured, terminal 200 selects one of the four previously configured explicit resources in PCell according to an indicated ARI (PUCCH resource 2 or 3 in FIG. 12). When a transmission mode supporting up to maximum two-CWs transmission is configured, terminal 200 selects one of the four previously configured explicit resource pairs in PCell made up of one set of two explicit resources according to the indicated ARI (PUCCH resources 2 and 3 in FIG. 12).

Terminal 200 transmits ACK/NACK corresponding to each PDSCH of PCell and SCell to base station 100 by Channel Selection. That is, when PUCCH transmission cell information X is PCell, terminal 200 determines that PDSCHs are assigned to terminal 200 in two downlink component carriers and applies an ACK/NACK transmission method optimized for the two downlink component carriers. The ACK/NACK transmission method optimized for the two downlink component carriers is, for example, PUCCH format 1b using Channel Selection.

<When CIF is not configured, when SCell PDSCH is assigned and X=SCell>

When CIF is not configured, base station 100 indicates SCell as PUCCH transmission cell information X in PDCCH indicating an SCell PDSCH. In this case, base station 100 assumes the TPC field (2 bits) as a TPC command of PUCCH (e.g., at the middle left in FIG. 11).

Terminal 200 transmits ACK/NACK corresponding to the SCell PDSCH using a PUCCH resource (PUCCH resource 0 in FIG. 12) in SCell associated with the top CCE index $n_{CCE}'$ occupied by the SCell PDCCH. In this case, when the PDCCH indicating the SCell PDSCH indicates non-MIMO (when the number of bits of ACK/NACK is one), the ACK/NACK is BPSK-mapped. On the other hand, when the PDCCH indicating the SCell PDSCH indicates MIMO (when the number of bits of ACK/NACK is two), the ACK/NACK is QPSK-mapped.

That is, when PUCCH transmission cell information X is SCell, terminal 200 determines that only a PDSCH of one downlink component carrier (SCell) is assigned to terminal 200 and applies an ACK/NACK transmission method optimized for one downlink component carrier. The ACK/NACK transmission method optimized for one downlink component carrier is, for example, PUCCH format 1a/1b.

<When CIF is configured, SCell PDSCH is assigned and X=PCell>

When CIF is configured, base station 100 indicates PCell as PUCCH transmission cell information X using a PCell PDCCH indicating an SCell PDSCH. In this case, base station 100 assumes the TPC field (2 bits) as a PUCCH TPC command (e.g., at the bottom right in FIG. 11).

Terminal 200 identifies a PUCCH resource in PCell (PUCCH resource 2 in FIG. 12) associated with the top CCE index $n_{CCE}'$ occupied by the PCell PDCCH as a transmission resource of ACK/NACK. When a transmission mode supporting up to maximum two-CWs transmission is configured, terminal 200 further identifies a PUCCH resource in PCell (PUCCH resource 3 in FIG. 12) associated with $n_{CCE}'+1$ adjacent to the top CCE index $n_{CCE}'$ as a transmission resource of ACK/NACK.

Terminal 200 reports ACK/NACK corresponding to each PDSCH of PCell and SCell to base station 100 by Channel Selection. That is, when PUCCH transmission cell information X is PCell, terminal 200 determines that PDSCHs are assigned to terminal 200 in two downlink component carriers and applies an ACK/NACK transmission method optimized for the two downlink component carriers.

<When CIF is configured, when SCell PDSCH is assigned and X=SCell>

When CIF is configured, base station 100 indicates SCell as PUCCH transmission cell information X using a PCell PDCCH indicating an SCell PDSCH. In this case, base station 100 assumes the TPC field (2 bits) to be an ARI of PUCCH (e.g., at the middle right in FIG. 11).

Terminal 200 selects one of four previously configured explicit resources in SCell by ARI (PUCCH resource 0 in FIG. 12). In this case, when the PCell PDCCH that indicates an SCell PDSCH indicates non-MIMO (when the number of bits of ACK/NACK is one), ACK/NACK is BPSK-mapped in the PUCCH resource. When the PCell PDCCH that indicates an SCell PDSCH indicates MIMO (when the number of bits of ACK/NACK is two), ACK/NACK is QPSK-mapped in the PUCCH resource.

That is, when PUCCH transmission cell information X is SCell, terminal 200 determines that PDSCH is assigned to terminal 200 in one downlink component carrier (SCell) and applies an ACK/NACK transmission method optimized for one downlink component carrier.

As described above, an example of switching between the ACK/NACK transmission methods when Channel Selection is configured has been described with reference to FIG. 11 and FIG. 12.

In this way, PUCCH transmission cell information X indicates a PUCCH transmission cell (see FIG. 10) and also indicates a method of transmitting ACK/NACK transmitted using an indicated cell. By so doing, terminal 200 can transmit ACK/NACK using an ACK/NACK transmission method optimized according to the number of downlink component carriers used for transmission of PDSCH. It is thereby possible to reduce a required average SNR of PUCCH to satisfy required receiving quality in base station 100.

Furthermore, PUCCH transmission cell information X can also be said to indicate whether the TPC field (2 bits) is information on a TPC command or ARI. That is, when CIF is not configured, if PUCCH transmission cell information X is PCell, the TPC field represents ARI, while if PUCCH transmission cell information X is SCell, the TPC field represents a TPC command. On the other hand, when CIF is configured, if PUCCH transmission cell information X is PCell, the TPC field represents a TPC command, while if PUCCH transmission cell information X is SCell, the TPC field represents ARI.

As described above, when at least an SCell PDSCH is assigned, base station 100 indicates PUCCH transmission cell information X using SCell. Here, PCell is an uplink component carrier whereby ACK/NACK is transmitted when PDSCHs are simultaneously assigned to both PCell and SCell, and the component carrier indicated by PUCCH transmission cell information X when PDSCHs are simultaneously assigned to both PCell and SCell is PCell.

By so doing, even when terminal 200 fails to receive PDCCH that indicates assignment of PDSCH, terminal 200 can identify an uplink component carrier whereby ACK/NACK should be transmitted. Thus, when ARQ is applied to communication using a plurality of downlink component carriers and a plurality of uplink component carriers and also when uplink component carriers for transmitting PUCCH are switched, it is possible to prevent the cell whereby base station 100 expects to receive a PUCCH from being different from the cell whereby terminal 200 actually transmits the PUCCH. Thus, base station 100 detects PUCCH using a single uplink component carrier, and can thereby prevent deterioration in detection accuracy of PUCCH in base station 100.

Furthermore, terminal 200 identifies the number of downlink component carriers assigned to terminal 200 based on PUCCH transmission cell information X, and can thereby transmit ACK/NACK using an optimum ACK/NACK transmission method. This makes it possible to reduce a required average SNR of PUCCH to satisfy required receiving quality in base station 100.

Figure 11:
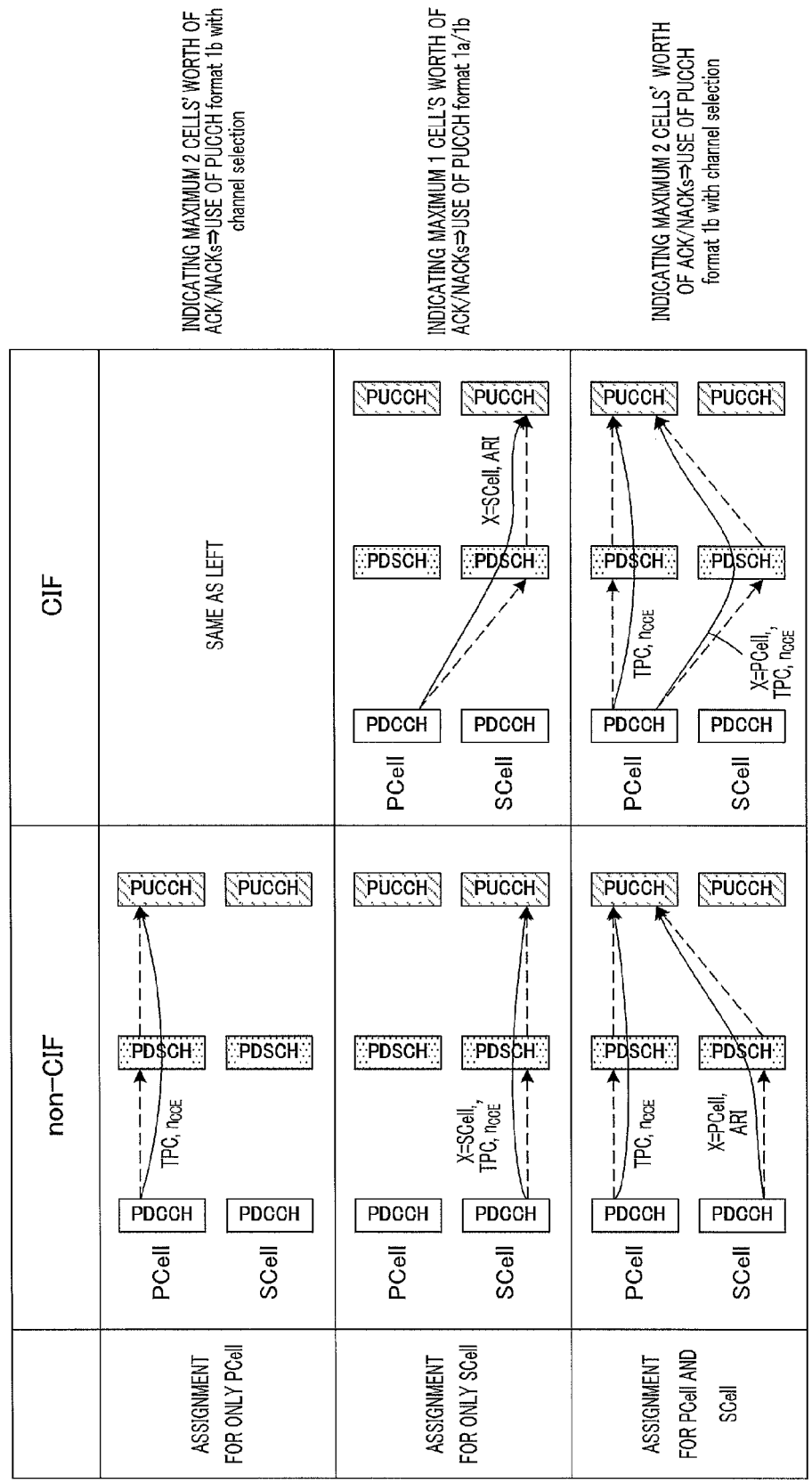
FIG. 11 is a diagram provided for describing operations of the base station and the terminal according to Embodiment 1 of the present invention.

A case has been described in FIG. 11 and FIG. 12 where PUCCH resources in SCell are associated with $n_{CCE}'$ when CIF is not configured and one of the four previously configured explicit resources in SCell is selected by ARI when CIF is configured. However, the present embodiment is not limited to this resource indication method. For example, even when CIF is not configured, one of the four previously configured explicit resources in SCell may be selected by ARI as a PUCCH resource in SCell. Alternatively, when CIF is not configured or when CIF is configured, only one of the previously configured explicit resources may always be used as a PUCCH resource in SCell without using ARI.

In the present embodiment, when CIF is configured, SCell is assumed to have poor quality due to interference. Thus, when CIF is configured, PUCCH may always be transmitted using PCell.

The present embodiment is configured such that PUCCH transmission cell information X is not indicated using PCell but PUCCH transmission cell information X is indicated using SCell, but conversely PUCCH transmission cell information X may be indicated using PCell. PUCCH transmission cell information X may be indicated using both PCell and SCell. When PUCCH transmission cell information X is indicated using SCell, base station 100 always assumes PUCCH transmission cell information X to be PCell when PDSCHs are assigned in both PCell and SCell. On the other hand, when PUCCH transmission cell information X is indicated using PCell, base station 100 always assumes, PUCCH transmission cell information X to be SCell when PDSCHs are assigned in both PCell and SCell. That is, when PUCCH transmission cell information X is indicated using PCell, the number of chances PUCCHs are indicated using SCell increases compared to when PUCCH transmission cell information X is indicated using SCell. That is, it is possible to enhance the effect of offloading PUCCH overhead in a macro cell (PCell) to a pico cell (SCell).

A case has been described in the present embodiment where PUCCH transmission cell information X indicates SCell when only an SCell PDSCH is assigned, but the present invention is not limited to this. For example, when an SCell PDSCH is assigned, PUCCH transmission cell information X may indicate PCell and ACK/NACK may be transmitted using a PUCCH in PCell. In this case, terminal 200 always transmits ACK/NACK using a PUCCH in PCell irrespective of a combination of PCell PDSCH assignment and SCell PDSCH assignment. In this way, for example, when an uplink (UL SCC) of SCell receives strong interference, terminal 200 can always transmit ACK/NACK using an uplink (UL PCC) of PCell having good quality. Since ACK/NACK can be indicated to base station 100 with good quality, it is possible to suppress the occurrence of unnecessary retransmission of downlink data.

In the present embodiment, as shown in FIG. 11, a PUCCH TPC command can be considered as a command to perform transmission power control of a PUCCH corresponding to a PDCCH including the TPC command. That is, the TPC command indicated using a PCell (SCell) PDCCH is a command for transmission power control of the PCell (SCell) PUCCH. In FIG. 11, when CIF is not configured, when PUCCH transmission cell information X indicates SCell, the TPC command indicated using a PDCCH is a TPC command of an SCell PUCCH. When CIF is not configured, and PUCCH transmission cell information X indicates PCell or when PUCCH transmission cell information X is not indicated and a PCell PDSCH is assigned, the TPC command indicated using a PDCCH is a TPC command of a PCell PUCCH.

On the other hand, in FIG. 11, when CIF is configured and PUCCH transmission cell information X indicates PCell, both PDCCH that indicates a PCell PDSCH and PDCCH that indicates an SCell PDSCH are transmitted in PCell. Thus, if the case where CIF is configured is considered in the same way as in the case where CIF is not configured, the TPC command indicated using each PDCCH of PCell can be considered to be a TPC command intended for the PCell PUCCH. For this reason, when CIF is configured, there is a problem that the TPC command indicated to terminal 200 becomes redundant.

Thus, when a TPC command is indicated by a TPC field of a PDCCH that indicates an SCell PDSCH only when CIF is configured, the TPC command may be assumed to be a TPC command intended for the SCell PUCCH and when a TPC command is indicated by a TPC field of a PDCCH that indicates a PCell PDSCH, the TPC command may be assumed to be a TPC command intended for a PCell PUCCH. By so doing, it is possible to cancel indication of the aforementioned redundant TPC command. The above-described TPC command intended for the SCell PUCCH is used for transmission power control during PUCCH transmission in SCell from the indicated time onward. Here, since SCell is assumed to be a narrower cell than PCell (e.g., cell intended for a terminal which is slowly moving or stopped) and a channel variation in SCell is small, the frequency of PUCCH transmission power control may be smaller than PCell.

(Embodiment 2)

The present embodiment will describe a case where the number of downlink component carriers configured in a terminal is two or more and five or less (PCell, SCell1, . . . ) and when there are two candidates for a PUCCH transmission cell.

Since a base station and a terminal according to the present embodiment have basic configurations common to those of base station 100 and terminal 200 according to Embodiment 1, these will be described with reference to FIGS. 8 and 9.

Base station 100 previously configures which SCell is used to indicate PUCCH transmission cell information X to terminal 200. Base station 100 does not indicate PUCCH transmission cell information X in PCell.

Hereinafter, a case will be described where four downlink component carriers of PCell and SCell1 to SCell3 are configured in terminal 200. PUCCH transmission cell information X is not indicated in PCell and SCell1, and PUCCH transmission cell information X is indicated in SCell2 and SCell3. That is, in the present embodiment, a downlink component carrier (cell) configured in terminal 200 is divided into a "cell that does not indicate PUCCH transmission cell information X" (including PCell) and a "cell that indicates PUCCH transmission cell information X." A case will be described where there are two candidates for PUCCH transmission cell: PCell and SCell2.

For example, X=0 in PUCCH transmission cell information X indicates PCell and X=1 to 3 indicate SCell1 to SCell3. That is, PUCCH transmission cell information X is 2-bit information. However, in a cell whereby PUCCH transmission cell information X is not indicated (here, PCell and SCell1), there is always only one candidate for the PUCCH transmission cell (e.g., PCell). Thus, candidates for the PUCCH transmission cell may be previously configured to reduce the number of information bits indicating X. For example, when candidates for the PUCCH transmission cell are PCell and SCell2, PUCCH transmission cell information X may be 1-bit information with X=0 indicating PCell and X=1 indicating SCell2.

When a PDSCH of a cell (PCell or SCell1) that does not indicate at least PUCCH transmission cell information X is assigned, PCell is set to be a PUCCH transmission cell. On the other hand, when no PDSCH of a cell that does not indicate PUCCH transmission cell information X is assigned and a PDSCH in a cell (SCell2 or SCell3) that indicates PUCCH transmission cell information X is assigned, SCell2 is set to be a PUCCH transmission cell.

More specifically, when only a PDSCH of a cell (PCell or SCell1) that does not indicate PUCCH transmission cell information X is assigned, base station 100 expects to receive a PUCCH in PCell. On the other hand, upon receiving only PDSCH assignment of a cell that does not indicate PUCCH transmission cell information X, terminal 200 transmits ACK/NACK using a PCell PUCCH.

When only a PDSCH of a cell (SCell2 or SCell3) that indicates PUCCH transmission cell information X is assigned, base station 100 indicates PUCCH transmission cell information X using a PDCCH (DL assignment) that indicates PDSCH of the cell. Here, PUCCH transmission cell information X indicates SCell2. Base station 100 expects to receive PUCCH in the cell indicated by PUCCH transmission cell information X. On the other hand, upon receiving only PDSCH assignment of a cell (SCell2 or SCell3) that indicates PUCCH transmission cell information X, terminal 200 also receives PUCCH transmission cell information X. Terminal 200 then identifies SCell2 indicated by PUCCH transmission cell information X as a PUCCH transmission cell. That is, terminal 200 transmits ACK/NACK using SCell2 PUCCH according to an instruction of PUCCH transmission cell information X.

When simultaneously assigning PDSCHs in a cell that does not indicate PUCCH transmission cell information X and a cell that indicates PUCCH transmission cell information X, base station 100 indicates PUCCH transmission cell information X using a PDCCH (DL assignment) that indicates PDSCH of the cell that indicates PUCCH transmission cell information X. Here, PUCCH transmission cell information X always indicates PCell. Base station 100 expects to receive PUCCH in PCell. On the other hand, upon successfully receiving at least one PDCCH (DL assignment) that indicates PDSCH of a cell that indicates PUCCH transmission cell information X, terminal 200 also receives PUCCH transmission cell information X. Terminal 200 then identifies that PUCCH transmission cell information X indicates PCell. Thus, terminal 200 transmits ACK/NACK corresponding to the received PDSCH according to the instruction of PUCCH transmission cell information X using PCell PUCCH. Note that upon successfully receiving only PDCCH that indicates PDSCH of a cell that does not indicate PUCCH transmission cell information X, terminal 200 transmits ACK/NACK corresponding to PDSCH using PCell PUCCH in the same way as in the case where base station 100 assigns only PDSCH of the cell that does not indicate PUCCH transmission cell information X.

Among the plurality of component carriers configured in terminal 200, PCell and SCell2 among the plurality of SCells are previously configured as PUCCH transmission cells. PUCCH transmission cell information X is transmitted using a predetermined number of SCells (SCell2 and SCell3) including SCell2. When only PDSCH of at least one component carrier among the above predetermined number of SCells (cells that indicate PUCCH transmission cell information X) is assigned, the component carrier indicated by PUCCH transmission cell information X is SCell2.

That is, when PDSCH is assigned using only the cell that does not indicate PUCCH transmission cell information X, ACK/NACK is transmitted using SCell2 PUCCH that indicates PUCCH transmission cell information X. On the other hand, when PDSCHs are assigned simultaneously to the cell that does not indicate PUCCH transmission cell information X and the cell that indicates PUCCH transmission cell information X, ACK/NACK is always transmitted using PCell PUCCH that does not indicate PUCCH transmission cell information X.

For example, suppose that terminal 200 fails to receive PDCCH that indicates PDSCH of a cell that does not indicate PUCCH transmission cell information X even if PDSCHs are simultaneously assigned to the cell that does not indicate PUCCH transmission cell information X and the cell that indicates PUCCH transmission cell information X. Even in this case, terminal 200 can identify that the PUCCH transmission cell is PCell based on PUCCH transmission cell information X included in PDCCH of the cell that indicates PUCCH transmission cell information X.

This eliminates the need for base station 100 to detect PUCCH using a plurality of uplink component carriers (PCell and SCell2) in preparation for a case where terminal 200 fails to receive PDCCH. That is, base station 100 needs only to detect PUCCH using only a single uplink component carrier whereby base station 100 expects to receive PUCCH in accordance with the PDSCH assignment of downlink component carriers to terminal 200 as described above. By so doing, it is possible to suppress deterioration in detection accuracy of PUCCH in base station 100.

Moreover, as described above, when PDSCHs are simultaneously assigned to the cell that does not indicate PUCCH transmission cell information X and the cell that indicates PUCCH transmission cell information X, ACK/NACK transmission (PUCCH transmission) is always performed in PCell that does not indicate PUCCH transmission cell information X. On the other hand, when PDSCH is assigned only to the cell that indicates PUCCH transmission cell information X, PUCCH transmission is performed in SCell2.

As described above, ACK/NACKs corresponding to a maximum of the number (4) of downlink component carriers configured in terminal 200 are transmitted using PCell PUCCH and ACK/NACKs corresponding to a maximum of the number (2) of downlink components carries that indicate PUCCH transmission cell information X are transmitted using SCell2 PUCCH.

That is, it is not necessary to assume ACK/NACK transmission corresponding to the number (4) of downlink component carriers configured in terminal 200 in SCell2 PUCCH and it is only necessary to perform ACK/NACK transmission optimized for the number (2) of downlink component carriers which is less than the total number of downlink component carriers configured in terminal 200.

Generally, in the case where two cells' worth of ACK/NACKs of four cells' worth of ACK/NACKs are always fixed to, for example, NACK and substantially two cells' worth of ACK/NACKs are multiplexed with a PUCCH resource and transmitted, and the case where only two cells' worth of ACK/NACKs are multiplexed with the PUCCH resource and transmitted, the latter can reduce a required average SNR of PUCCH to satisfy required receiving quality in base station 100. That is, performing ACK/NACK transmission optimized for the smaller number of downlink component carriers makes it possible to reduce the required average SNR of PUCCH to satisfy required receiving quality in base station 100. The effect obtained by optimizing the ACK/NACK transmission method in accordance with the number of downlink component carriers is a special effect in the present invention which is different from the reduction of transmission power and the reduction of interference attributable to the switching of PUCCH transmission to nearby pico eNB.

As described above, as with Embodiment 1, PUCCH transmission cell information X indicates a PUCCH transmission cell (uplink component carrier) and at the same time indicates the maximum number of downlink component carriers, PDSCH error detection results of which are indicated in the cell. That is, PUCCH transmission cell information X indicates the ACK/NACK transmission method as well.

An example of switching between ACK/NACK transmission methods when PUCCH format 3 is configured will be described with reference to FIG. 13 and FIG. 14. Note that when CIF (Cross Indicator Field) is configured, the present embodiment is substantially the same as Embodiment 1 (FIG. 11 and FIG. 12), and therefore description thereof will be omitted here.

<When PCell PDSCH is assigned>

Figure 13:
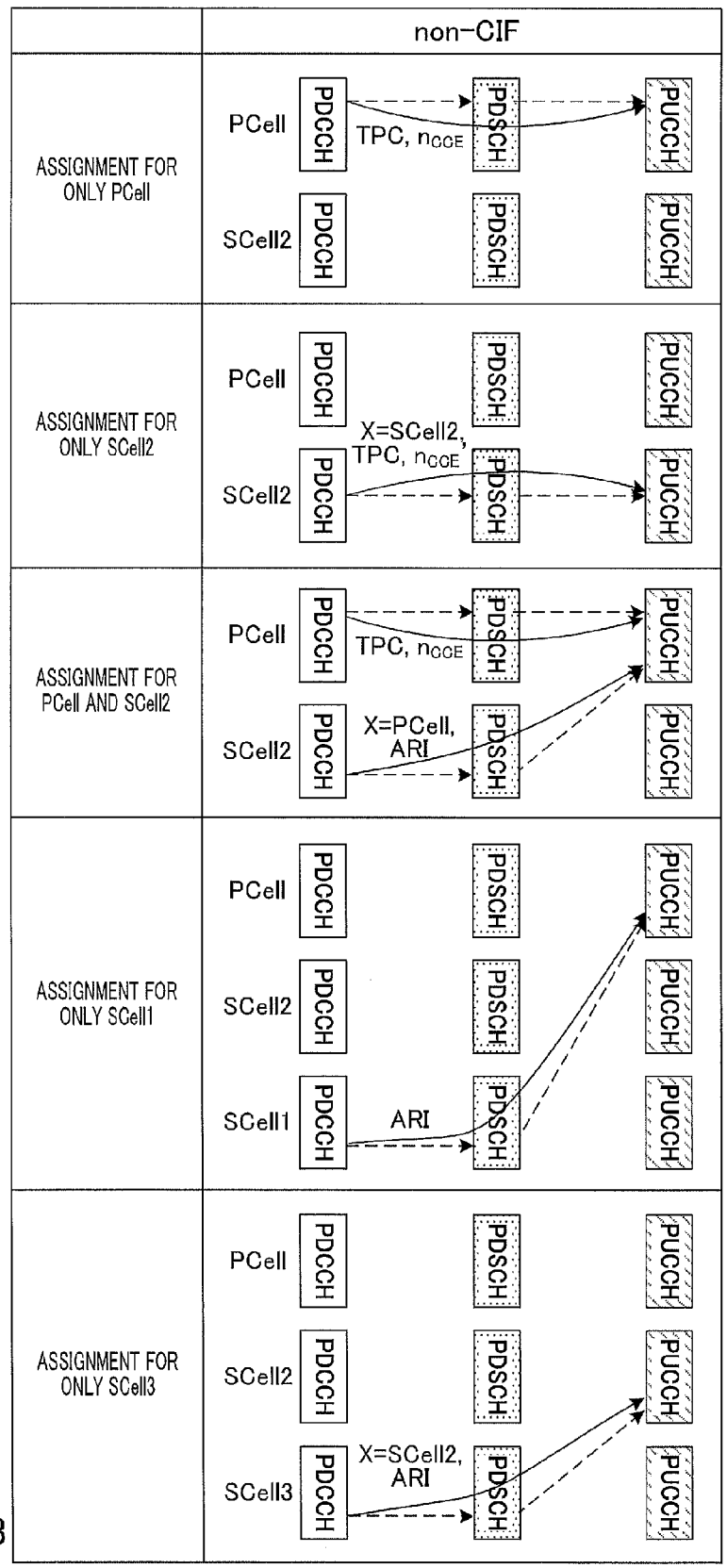
FIG. 13 is a diagram provided for describing operations of a base station and a terminal according to Embodiment 2 of the present invention.

When PCell PDSCH is assigned, base station 100 assumes the TPC field (2 bits) to be a TPC command of PUCCH in PDCCH that indicates the PCell PDSCH (e.g., "only PCell is assigned" or "PCell and SCell2 are assigned" shown in FIG. 13). Terminal 200 identifies a PUCCH resource in PCell (PUCCH format 1b resource in FIG. 14) associated with the top CCE index $n_{CCE}$ occupied by the PDCCH as a transmission resource of ACK/NACK.

When only PCell PDSCH is assigned, that is, when no SCell PDSCH is assigned, terminal 200 transmits ACK/NACK corresponding to PCell PDSCH using a PUCCH resource in PCell associated with the top CCE index $n_{CCE}$. In this case, when PDCCH that indicates PCell PDSCH indicates non-MIMO (when the number of bits of ACK/NACK is one), ACK/NACK is BPSK-mapped. When PDCCH that indicates PCell PDSCH indicates MIMO (when the number of bits of ACK/NACK is two), ACK/NACK is QPSK-mapped. LTE fallback can be supported in this way.

<When only SCell1 PDSCH is assigned>

Base station 100 assumes the TPC field (2 bits) to be ARI in PDCCH that indicates PDSCH of a cell other than PCell that does not indicate PUCCH transmission cell information X (SCell1). Terminal 200 selects one of four previously configured explicit resources in PCell according to the indicated ARI (PUCCH format 3 resource in FIG. 14).

<When PDSCHs in PCell and SCell2 are assigned>

When PDSCHs of PCell and SCell2 that indicates a PUCCH transmission cell are assigned, base station 100 indicates PCell as PUCCH transmission cell information X in PDCCH that indicates PDSCH of a cell that indicates PUCCH transmission cell information X (SCell2). In this case, base station 100 assumes the TPC field (2 bits) in the PDCCH to be ARI. Terminal 200 selects one of four previously configured explicit resources in PCell according to the indicated ARI (PUCCH format 3 resource in FIG. 14). The same applies to a case where PDSCHs of PCell and SCell3 that indicates a PUCCH transmission cell are assigned.

As described above, when ACK/NACK is transmitted using PCell PUCCH, ACK/NACKs corresponding to PDSCHs of a maximum of all cells (downlink component carriers) configured in terminal 200 may be transmitted. For this reason, when PDCCH that indicates PDSCH of at least a cell that does not indicate PUCCH transmission cell information X is detected or when PUCCH transmission cell information X is PCell, terminal 200 applies an ACK/NACK transmission method optimized in accordance with the number of downlink component carriers configured in terminal 200. For example, when the number of downlink component carriers configured in terminal 200 is assumed to be four, PUCCH format 3 is used.

<When only SCell2 PDSCH is assigned>

Base station 100 indicates SCell2 as PUCCH transmission cell information X in PDCCH that indicates SCell2 PDSCH. In this case, base station 100 assumes the TPC field (2 bits) in the PDCCH to be a TPC command of PUCCH. Terminal 200 transmits ACK/NACK corresponding to SCell2 PDSCH using a PUCCH resource (PUCCH format 1b resource in FIG. 14) in SCell associated with the top CCE index $n_{CCE}'$ occupied by PDCCH that indicates SCell2 PDSCH. In this case, when PDCCH that indicates SCell2

PDSCH indicates non-MIMO (when the number of bits of ACK/NACK is one), ACK/NACK is BPSK-mapped. When PDCCH that indicates SCell2 PDSCH indicates MIMO (when the number of bits of ACK/NACK is two), ACK/NACK is QPSK-mapped.

<When only SCell3 PDSCH is assigned>

Base station 100 indicates SCell2 as PUCCH transmission cell information X in PDCCH that indicates PDSCH of a cell other than SCell2 (candidate of a PUCCH transmission cell) that indicates PUCCH transmission cell information X (SCell3). In this case, base station 100 assumes the TPC field (2 bits) in the PDCCH as ARI. Terminal 200 selects one of four previously configured explicit resources in SCell2 according to the indicated ARI (PUCCH format 3 resource in FIG. 14).

As described above, when only PDSCH of a cell that indicates PUCCH transmission cell information X is assigned, base station 100 configures PUCCH transmission cell information X transmitted using PDCCH of each cell in SCell2. Thus, when ACK/NACK is transmitted using SCell2 PUCCH, a maximum of ACK/NACKs corresponding to PDSCHs of all cells that indicate PUCCH transmission cell information X may be transmitted. For this reason, when PUCCH transmission cell information X is SCell, terminal 200 applies an ACK/NACK transmission method optimized in accordance with the number of cells that indicate PUCCH transmission cell information X. For example, when the number of downlink component carriers that indicate PUCCH transmission cell information X is assumed to be two, PUCCH format 3 is used.

An example of switching between ACK/NACK transmission methods when PUCCH format 3 is configured has been described with reference to FIG. 13 and FIG. 14.

Thus, as with Embodiment 1, PUCCH transmission cell information X not only indicates a PUCCH transmission cell but also indicates an ACK/NACK transmission method. As with Embodiment 1, this makes it possible to reduce a required average SNR of PUCCH to satisfy required receiving quality in base station 100. Furthermore, PUCCH transmission cell information X can also be said to indicate whether the TPC field (2 bits) is information indicating a TPC command or ARI.

In this way, even when the number of downlink component carriers configured in terminal 200 is two or more and five or less, and when there are two PUCCH transmission cell candidates, it is possible to suppress deterioration in detection accuracy of PUCCH in base station 100 as with Embodiment 1. Moreover, terminal 200 identifies the number of downlink component carriers to which PDSCHs corresponding to terminal 200 are assigned, and can thereby transmit ACK/NACK using an optimum ACK/NACK transmission method and reduce a required average SNR of a PUCCH to satisfy required receiving quality in base station 100.

Figure 15:
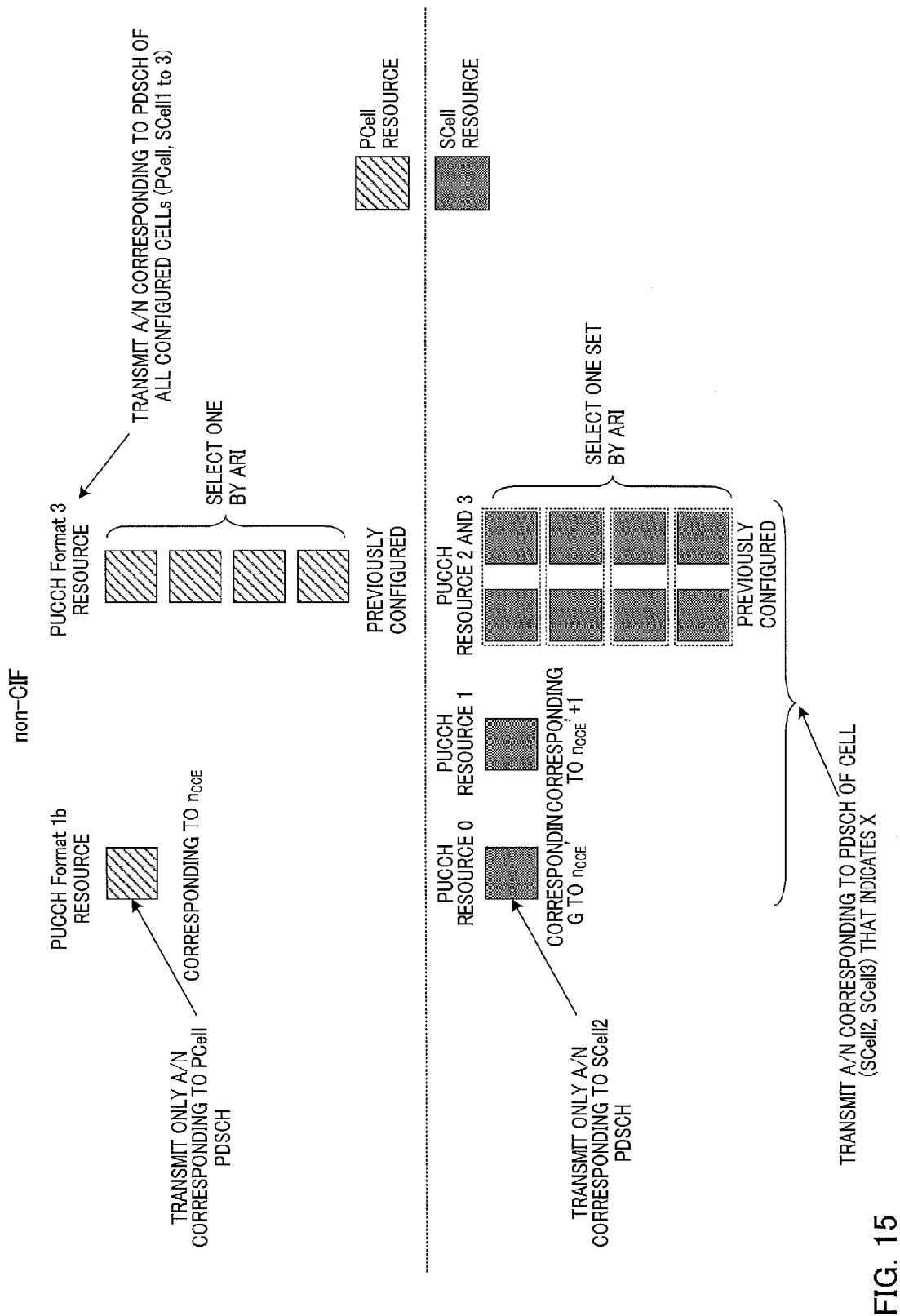
FIG. 15 is a diagram provided for describing other PUCCH resources according to Embodiment 2 of the present invention.

In the present embodiment, even when PUCCH format 3 is configured as an ACK/NACK transmission method in PCell, if it is only a maximum of two cells' worth of ACK/NACKs that are transmitted in SCell2, an ACK/NACK transmission method different from PCell such as Channel Selection may be applied as an ACK/NACK transmission method in SCell2 as shown in FIG. 15.

Figure 14:
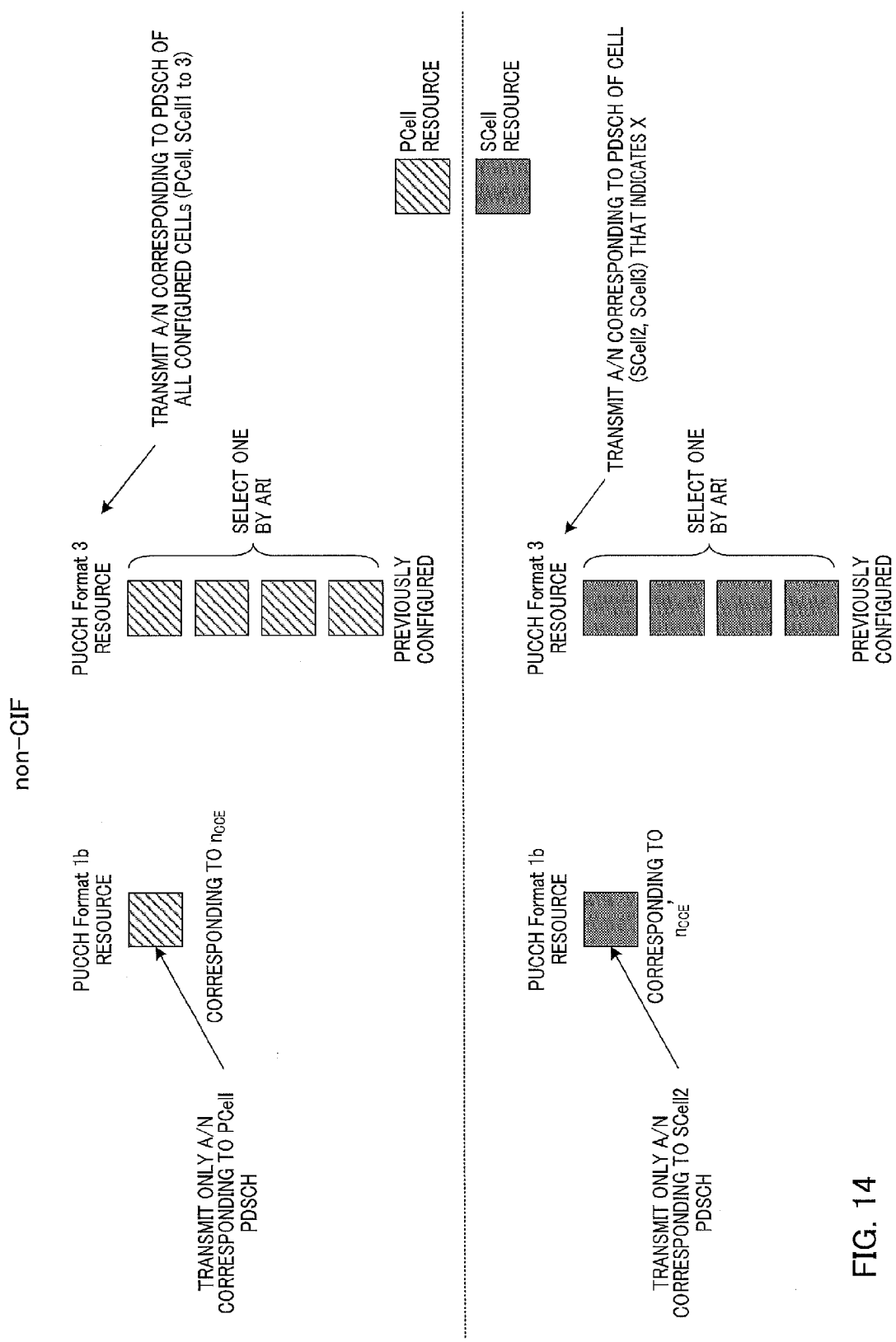
FIG. 14 is a diagram provided for describing PUCCH resources according to Embodiment 2 of the present invention.

A case has been described in the present embodiment where PUCCH resources in SCell are associated with $n_{CCE}'$ (and $n_{CCE}'+1$) in FIG. 13, FIG. 14 or FIG. 15, but the present invention is not limited to this resource indicating method. For example, terminal 200 may select one of four previously configured explicit resources in SCell according to ARI.

Alternatively, when CIF is not configured or when CIF is configured, the embodiment may be configured such that no ARI is indicated to terminal 200 and terminal 200 always uses only one previously configured explicit resource.

A case has been described in the present embodiment where PCell and SCell1 do not indicate PUCCH transmission cell information X, but SCell2 and SCell3 indicate PUCCH transmission cell information X, but the present invention is not limited to this. PUCCH transmission cell information X may be indicated using PCell. Moreover, PUCCH transmission cell information X may be indicated using all cells.

A case has been described in the present embodiment where when only PDSCH of a cell that indicates PUCCH transmission cell information X is assigned, PUCCH transmission cell information X indicates SCell2, but the present invention is not limited to this. For example, when only PDSCH of a cell that indicates PUCCH transmission cell information X is assigned, PUCCH transmission cell information X may indicate PCell and ACK/NACK may be transmitted using PUCCH in PCell.

(Embodiment 3)

The present embodiment will describe a case where when the number of downlink component carriers configured in a terminal is three or more and five or less (PCell, SCell1, SCell2, ... ), and the number of candidates for a PUCCH transmission cell is three or more and equal to or less than the number of downlink component carriers configured in the terminal.

Since a base station and a terminal according to the present embodiment have basic configurations common to those of base station 100 and terminal 200 according to Embodiment 1, these will be described with reference to FIGS. 8 and 9.

Base station 100 previously configures which SCell is used to indicate PUCCH transmission cell information X to terminal 200. Base station 100 does not indicate PUCCH transmission cell information X using PCell.

Hereinafter, a case will be described where five downlink component carriers of PCell and SCell1 to SCell4 are configured for terminal 200. PUCCH transmission cell information X is not indicated in PCell or SCell1, but PUCCH transmission cell information X is indicated in SCell2 and SCell4. Moreover, a case will be described where candidates for a PUCCH transmission cell are PCell, SCell2 and SCell4.

For example, in PUCCH transmission cell information X, X=0 indicates PCell and X=1 to 4 indicate SCell1 to SCell4. That is, PUCCH transmission cell information X is 3-bit information. However, in a cell in which PUCCH transmission cell information X is not indicated (here, PCell and SCell1), there is always only one candidate of the PUCCH transmission cell (e.g., PCell). Thus, candidates for the PUCCH transmission cell may be previously configured to reduce the number of information bits indicating X. For example, when there are three candidates for the PUCCH transmission cell: PCell, SCell2 and SCell4, PUCCH transmission cell information X may be 2-bit information with X=0 indicating PCell, X=1 indicating SCell2 and X=2 indicating SCell4.

Figure 16:
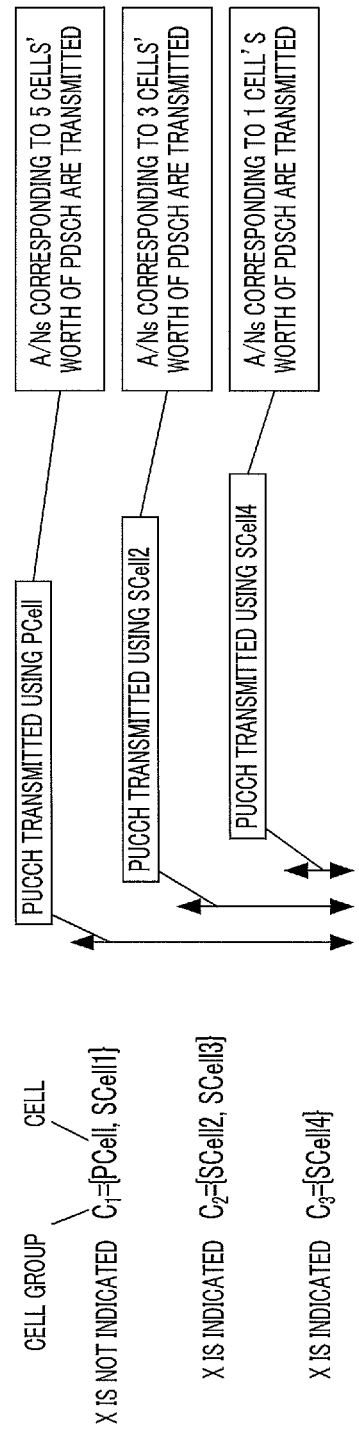
FIG. 16 is a diagram provided for describing operations of a base station and a terminal according to Embodiment 3 of the present invention.

In the present embodiment, as shown in FIG. 16, downlink component carriers (cells) to be configured in terminal 200 are grouped so that the same number of cell groups as candidates (three candidates here) of the PUCCH transmission cell are configured. However, each cell group is configured to include at least one candidate of the PUCCH transmission cell. For example, in FIG. 16, a group of cells that do not indicate PUCCH transmission cell information X (PCell and SCell1) is assumed to be cell group $C_1$, SCell2 and SCell3 of cells that indicate PUCCH transmission cell information X are assumed to be cell group $C_2$ and remaining SCell4 s assumed to be cell group $C_3$.

Note that since downlink component carriers belonging to cell group $C_1$ can be identified by a configuration as to which SCell indicates PUCCH transmission cell information X, only downlink component carriers belonging to cell groups $C_2$ and $C_3$ may be configured without configuring cell group $C_1$.

Next, operations of base station 100 and terminal 200 in the present embodiment will be described with reference to FIG. 16.

<When PDSCH of cell belonging to cell group $C_1$ is assigned>

When assigning PDSCHs of at least cells that do not indicate PUCCH transmission cell information X (cells belonging to cell group $C_1$), base station 100 indicates PUCCH transmission cell information X using cells that indicate PUCCH transmission cell information X (cells belonging to cell group $C_2$ or $C_3$). Here, PUCCH transmission cell information X indicates PCell.

On the other hand, when PDCCH is detected which indicates PDSCHs of cells that do not indicate PUCCH transmission cell information X (cells belonging to cell group $C_1$) or when PDCCH is detected which indicates PDSCH of cells that indicate PUCCH transmission cell information X (cells belonging to cell group $C_2$ or $C_3$) and when X indicates PCell, terminal 200 transmits ACK/NACK corresponding to the received PDSCH using PCell PUCCH.

That is, when PDCCH is detected to which PDSCH of cells belonging to cell group $C_1$ are assigned or when PUCCH transmission cell information X is PCell, terminal 200 determines that PDSCHs are assigned to terminal 200 in a maximum of five cells. Thus, terminal 200 applies an ACK/NACK transmission method optimized for 5 cells which are downlink component carriers configured in terminal 200.

<When Pdschs of cells belonging to cell group $C_1$ are not assigned and when PDSCHs of cells belonging to cell group $C_2$ are assigned>

When PDSCHs of cells that do not indicate PUCCH transmission cell information X (cells belonging to cell group $C_1$) are not assigned and when PDSCHs of cells belonging to cell group $C_2$ are assigned, base station 100 indicates PUCCH transmission cell information X using cells that indicate PUCCH transmission cell information X (cells belonging to cell group $C_2$ or $C_3$). Here, PUCCH transmission cell information X indicates SCell2.

On the other hand, terminal 200 detects PDCCH that indicates PDSCH assignment of cells that indicate PUCCH transmission cell information X (cells belonging to cell group $C_2$ or $C_3$), and when X indicates SCell2, terminal 200 transmits ACK/NACK corresponding to the received PDSCH using an SCell2 PUCCH.

That is, when PUCCH transmission cell information X is SCell2, terminal 200 determines that PDSCHs are assigned to terminal 200 in a maximum of three cells (SCell2 to SCell4). Thus, terminal 200 applies an ACK/NACK transmission method optimized for three cells which are downlink component carriers belonging to cell groups $C_2$ and $C_3$.

<When PDSCHs of cells belonging to cell groups $C_1$ and $C_2$ are not assigned and PDSCHs of cells belonging to cell group $C_3$ are assigned>

When not assigning PDSCHs of cells belonging to cell groups $C_1$ and $C_2$ but assigning PDSCHs of cells belonging to cell group $C_3$, base station 100 indicates PUCCH transmission cell information X using SCell4 belonging to cell group $C_3$. Here, PUCCH transmission cell information X indicates SCell4.

On the other hand, when PDCCH is detected which indicates PDSCH assignment of cells belonging to cell group $C_3$ and when X indicates SCell4, terminal 200 transmits ACK/NACK corresponding to the received PDSCH using an SCell4 PUCCH.

That is, when PUCCH transmission cell information X is SCell4, terminal 200 determines that PDSCH has been assigned to terminal 200 using a maximum of one cell (SCell4). Thus, terminal 200 applies an ACK/NACK transmission method optimized for one cell which is a cell belonging to cell group $C_3$ (downlink component carrier).

As described above, in FIG. 16, when at least PDSCH of a cell belonging to cell group $C_1$ is assigned, PCell is assumed to be a PUCCH transmission cell (X=PCell). On the other hand, when no PDSCH of cell group $C_1$ is assigned but at least PDSCH of a cell belonging to cell group $C_2$ is assigned, SCell2 is assumed to be a PUCCH transmission cell (X=SCell2). When no PDSCH of cell groups $C_1$ and $C_2$ is assigned but only PDSCH of cell group $C_3$ is assigned, SCell4 is assumed to be a PUCCH transmission cell (X=SCell4).

When X=PCell, since PDSCHs of a maximum of five cells configured in terminal 200 are assigned, terminal 200 transmits a maximum of five cells' worth of ACK/NACKs using an ACK/NACK transmission method (e.g., PUCCH format 3) optimized for five cells. When X=SCell2, since PDSCHs of a maximum of three cells are assigned, terminal 200 transmits a maximum of three cells' worth of ACK/NACKs using an ACK/NACK transmission method (e.g., PUCCH format 3) optimized for three cells. Here, in PUCCH format 3, ACK/NACKs of a predetermined size are generated irrespective of the number of cells, error detection results of which are indicated. That is, it is possible to reduce the coding rate more by generating three CCs' worth of ACK/NACKs than by generating five CCs' worth of ACK/NACKs.

When X=SCell4, since PDSCH of a maximum of one cell is assigned, terminal 200 transmits a maximum of one cell's worth of ACK/NACKs using an ACK/NACK transmission method (e.g., PUCCH format 1a/1b) optimized for one cell.

In this way, terminal 200 identifies a maximum number of downlink component carriers in which PDSCHs are assigned to terminal 200 based on PUCCH transmission cell information X, and can thereby use an ACK/NACK transmission method appropriate for the maximum number of downlink component carriers. In this way, it is possible to reduce the required average SNR of PUCCH to satisfy required receiving quality in base station 100 as with Embodiment 1.

By so doing, when the number of downlink component carriers configured in terminal 200 is three or more and five or less and even when the number of candidates for the PUCCH transmission cell is three or more and equal to or less than the number of downlink component carriers configured in terminal 200, it is possible to suppress deterioration in detection accuracy of PUCCH in base station 100 as with Embodiment 1. Furthermore, terminal 200 identifies the number of downlink component carriers to which PDSCHs for terminal 200 are assigned, and can thereby transmit ACK/NACK using an optimum ACK/NACK transmission method and reduce a required average SNR of PUCCH to satisfy required receiving quality in base station 100.

A case has been described in the present embodiment where PUCCH transmission cell information X is not indicated in PCell and SCell1 and PUCCH transmission cell information X is indicated in SCell2, SCell3 and SCell4, but the present invention is not limited to this. PUCCH transmission cell information X may be indicated in PCell. Alternatively, PUCCH transmission cell information X may be indicated in all cells.

The embodiments according to the present invention have been described so far.

A case has been described in the above-described embodiments where when PDSCHs are simultaneously assigned in PCell and SCell, ACK/NACKs corresponding to the PDSCHs are always transmitted in PCell. However, without being limited to this, when PDSCHs are simultaneously assigned in PCell and SCell, terminal 200 may transmit ACK/NACKs corresponding to the PDSCHs in SCell. In this case, for example, when only PCell PDSCH is assigned, base station 100 may indicate PCell as PUCCH transmission cell information X, and when PDSCHs are simultaneously assigned in both PCell and SCell, base station 100 may indicate SCell as PUCCH transmission cell information X. PUCCH transmission cell information X may also be indicated in at least PCell. In this case, compared to the above-described embodiments, there are more chances that PUCCHs are indicated in SCell, it is possible to enhance the effect of offloading PUCCH overhead in a macro cell (PCell) to a pico cell (SCell).

Each functional block used in the description of the foregoing embodiments may be implemented by software that functions by a computer executing a program or in cooperation between software and hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

As described thus far, a terminal apparatus according to the present disclosure is a terminal apparatus that communicates with a base station apparatus using a plurality of component carriers, the terminal apparatus including: a generating section that generates a response signal using error detection results of downlink data transmitted using the plurality of component carriers; and a control section that transmits the response signal using a component carrier indicated by indication information that indicates a component carrier to be used for transmission of the response signal, in which: the plurality of component carriers include a first component carrier and a second component carrier which is different from the first component carrier, the first component carrier being a component carrier used for transmission of the response signal when downlink data is simultaneously assigned to both the first component carrier and the second component carrier; the indication information is indicated from the base station apparatus using the second component carrier when downlink data of at least the second component carrier is assigned; and when downlink data is simultaneously assigned to both the first component carrier and the second component carrier, the component carrier indicated by the indication information is the first component carrier.

In the terminal apparatus according to this disclosure, when only downlink data of the second component carrier is assigned, the component carrier indicated by the indication information is the second component carrier.

In the terminal apparatus according to this disclosure, the control section transmits the response signal using a first transmission method when the indication information indicates the first component carrier, and transmits the response signal using a second transmission method which is different from the first transmission method when the indication information indicates the second component carrier.

In the terminal apparatus according to this disclosure, when the indication information indicates the second component carrier, the generating section generates the response signal using an error detection result corresponding to downlink data of a number of component carriers less than a total number of the plurality of component carriers.

In the terminal apparatus according to this disclosure, the generating section generates a response signal for downlink data of both the first component carrier and the second component carrier when the indication information indicates the first component carrier and generates a response signal for only downlink data of the second component carrier when the indication information indicates the second component carrier.

In the terminal apparatus according to this disclosure, when only downlink data of the second component carrier is assigned, the component carrier indicated by the indication information is any one of the first component carrier and the second component carrier.

In the terminal apparatus according to this disclosure, the control section transmits the response signal using the first component carrier upon receiving downlink assignment control information corresponding to downlink data of at least the first component carrier and transmits the response signal using a component carrier indicated by the indication information upon receiving only downlink assignment control information corresponding to downlink data of the second component carrier.

In the terminal apparatus according to this disclosure, among the plurality of component carriers, the first component carrier and a third component carrier of a plurality of the second component carriers are previously configured as component carriers to be used for transmission of the response signal; the indication information is transmitted using a predetermined number of the second component carriers including the third component carrier; and when only downlink data of at least one component carrier of the predetermined number of second component carriers is assigned, the component carrier indicated by the indication information is the third component carrier.

In the terminal apparatus according to this disclosure: the control section transmits the response signal using a transmission method corresponding to the number of the plurality of component carriers when the component carrier indicated by the indication information is the first component carrier; and the control section transmits the response signal using a transmission method corresponding to the predetermined number of second component carriers when the component carrier indicated by the indication information is the third component carrier.

A base station apparatus according to the present disclosure is a base station apparatus that communicates with a terminal apparatus using a plurality of component carriers, the base station apparatus including: a transmitting section that transmits downlink data using the plurality of component carriers; and a receiving section that receives the response signal in a component carrier indicated by indication information that indicates a component carrier to be used for transmission of a response signal corresponding to downlink data, in which: the plurality of component carriers include a first component carrier and a second component carrier other than the first component carrier, the first component carrier being a component carrier used for transmission of the response signal when downlink data is simultaneously assigned to both the first component carrier and the second component carrier; the indication information is indicated to the terminal apparatus using the second component carrier when downlink data of at least the second component carrier is assigned; and when downlink data is simultaneously assigned to both the first component carrier and the second component carrier, the component carrier indicated by the indication information is the first component carrier.

A transmission method according to the present disclosure is a transmission method for a terminal apparatus that communicates with a base station apparatus using a plurality of component carriers, the transmission method including: generating a response signal using error detection results of downlink data transmitted using the plurality of component carriers; and transmitting the response signal using a component carrier indicated by indication information that indicates a component carrier to be used for transmission of the response signal, in which: the plurality of component carriers include a first component carrier and a second component carrier which is different from the first component carrier, the first component carrier being a component carrier used for transmission of the response signal when downlink data is simultaneously assigned to both the first component carrier and the second component carrier; the indication information is indicated from the base station apparatus using the second component carrier when downlink data of at least the second component carrier is assigned; and when downlink data is simultaneously assigned to both the first component carrier and the second component carrier, the component carrier indicated by the indication information is the first component carrier.

A reception method according to the present disclosure is a reception method for a base station apparatus that communicates with a terminal apparatus using a plurality of component carriers, the reception method including: a transmitting section that transmits downlink data using the plurality of component carriers; and a receiving section that receives the response signal in a component carrier indicated by indication information that indicates a component carrier to be used for transmission of a response signal corresponding to downlink data, in which: the plurality of component carriers include a first component carrier and a second component carrier other than the first component carrier, the first component carrier being a component carrier used for transmission of the response signal when downlink data is simultaneously assigned to both the first component carrier and the second component carrier; the indication information is indicated to the terminal apparatus using the second component carrier when downlink data of at least the second component carrier is assigned; and when downlink data is simultaneously assigned to both the first component carrier and the second component carrier, the component carrier indicated by the indication information is the first component carrier.

The disclosure of the specification, drawings, and abstract in Japanese Patent Application No. 2012-124561 filed on May 31, 2012 is incorporated herein by reference in its entirety.

INDUSTRIAL APPLICABILITY

The present invention is suitable for use in mobile communication systems, for example.

REFERENCE SIGNS LIST

100 Base station
200 Terminal
101, 208 Control section
102 Control information generating section
103, 105 Coding section
104, 107 Modulation section
106 Data transmission controlling section
108 Mapping section
109, 218 IFFT section
110, 219 CP adding section
111, 222 Radio transmitting section
112, 201 Radio receiving section
113, 202 CP removing section
114 PUCCH extracting section
115 Despreading section
116 Sequence controlling section
117 Correlation processing section
118 A/N determining section
119 Bundled A/N despreading section
120 IDFT section
121 Bundled A/N determining section
122 Retransmission control signal generating section
203 FFT section
204 Extraction section
205, 209 Demodulation section
206, 210 Decoding section
207 Determination section
211 CRC section
212 Response signal generating section
213 Coding and modulation section
214 Primary-spreading section
215 Secondary-spreading section
216 DFT section
217 Spreading section
220 Time multiplexing section
221 Selection section

The invention claimed is:
1. A terminal apparatus that communicates with a base station apparatus using a plurality of component carriers, the terminal apparatus comprising:
   circuitry, which, in operation generates a response signal using error detection results of downlink data transmitted using the plurality of component carriers; and
   a transmitter, which, in operation, transmits the response signal using a component carrier indicated by indication information that indicates a component carrier to be used for transmission of the response signal, wherein:

the plurality of component carriers include a first component carrier and a second component carrier which is different from the first component carrier, the first component carrier being a component carrier used for transmission of the response signal when downlink data is simultaneously assigned to both the first component carrier and the second component carrier, the first component carrier being a component carrier not used to indicate the indication information when multiple component carriers are used by the base station, and the second component carrier being a component carrier used for transmission of the response signal when downlink data is assigned to only the second component carrier;

the indication information is indicated from the base station apparatus using the second component carrier when downlink data of at least the second component carrier is assigned; and when downlink data is simultaneously assigned to both the first component carrier and the second component carrier, the component carrier indicated by the indication information is the first component carrier, and when downlink data is assigned to only the second component carrier, the carrier indicated by the indication information is the second component carrier.

2. The terminal apparatus according to claim 1 wherein the transmitter transmits the response signal using a first transmission method when the indication information indicates the first component carrier, and transmits the response signal using a second transmission method which is different from the first transmission method when the indication information indicates the second component carrier.

3. The terminal apparatus according to claim 1 wherein, when the indication information indicates the second component carrier, the circuitry generates the response signal using an error detection result corresponding to downlink data of a number of component carriers less than a total number of the plurality of component carriers.

4. The terminal apparatus according to claim 1 wherein the circuitry generates a response signal for downlink data of both the first component carrier and the second component carrier when the indication information indicates the first component carrier and generates a response signal for only downlink data of the second component carrier when the indication information indicates the second component carrier.

5. The terminal apparatus according to claim 1, wherein, when only downlink data of the second component carrier is assigned, the component carrier indicated by the indication information is any one of the first component carrier and the second component carrier.

6. The terminal apparatus according to claim 1, wherein the transmitter transmits the response signal using the first component carrier upon receiving downlink assignment control information corresponding to downlink data of at least the first component carrier and transmits the response signal using a component carrier indicated by the indication information upon receiving only downlink assignment control information corresponding to downlink data of the second component carrier.

7. The terminal apparatus according to claim 1, wherein: among the plurality of component carriers, the first component carrier and a third component carrier of a plurality of the second component carriers are previously configured as component carriers to be used for transmission of the response signal;

the indication information is transmitted using a predetermined number of the second component carriers including the third component carrier; and when only downlink data of at least one component carrier of the predetermined number of second component carriers is assigned, the component carrier indicated by the indication information is the third component carrier.

8. The terminal apparatus according to claim 7, wherein:
the transmitter transmits the response signal using a transmission method corresponding to the number of the plurality of component carriers when the component carrier indicated by the indication information is the first component carrier; and the transmitter transmits the response signal using a transmission method corresponding to the predetermined number of second component carriers when the component carrier indicated by the indication information is the third component carrier.

9. A base station apparatus that communicates with a terminal apparatus using a plurality of component carriers, the base station apparatus comprising:
a transmitter, which, in operation, transmits downlink data using the plurality of component carriers; and
a receiver, which, in operation, receives a response signal corresponding to the downlink data in a component carrier indicated by indication information that indicates a component carrier to be used for transmission of the response signal, wherein:

the plurality of component carriers include a first component carrier and a second component carrier other than the first component carrier, the first component carrier being a component carrier used for transmission of the response signal when downlink data is simultaneously assigned to both the first component carrier and the second component carrier, the first component carrier being a component carrier not used to indicate the indication information when multiple component carriers are used by the base station, and the second component carrier being a component carrier used for transmission of the response signal when downlink data is assigned to only the second component carrier;

the indication information is indicated to the terminal apparatus using the second component carrier when downlink data of at least the second component carrier is assigned; and when downlink data is simultaneously assigned to both the first component carrier and the second component carrier, the component carrier indicated by the indication information is the first component carrier, and when downlink data is assigned to only the second component carrier, the carrier component carrier indicated by the indication information is the second component carrier.

10. A transmission method for a terminal apparatus that communicates with a base station apparatus using a plurality of component carriers, the transmission method comprising:
generating a response signal using error detection results of downlink data transmitted using the plurality of component carriers; and transmitting the response signal using a component carrier indicated by indication information that indicates a component carrier to be used for transmission of the response signal, wherein:

the plurality of component carriers include a first component carrier and a second component carrier which is different from the first component carrier, the first component carrier being a component carrier used for transmission of the response signal when downlink data is simultaneously assigned to both the first component carrier and the second component carrier, the first component carrier being a component carrier not used to indicate the indication information when multiple component carriers are used by the base station, and the second component carrier being a component carrier used for transmission of the response signal when downlink data is assigned to only the second component carrier;

the indication information is indicated from the base station apparatus using the second component carrier when downlink data of at least the second component carrier is assigned; and when downlink data is simultaneously assigned to both the first component carrier and the second component carrier, the component carrier indicated by the indication information is the first component carrier, and when downlink data is assigned to only the second component carrier, the carrier component carrier indicated by the indication information is the second component carrier.

11. A reception method for a base station apparatus that communicates with a terminal apparatus using a plurality of component carriers, the reception method comprising:

transmitting downlink data using the plurality of component carriers; and receiving a response signal corresponding to the downlink data in a component carrier indicated by indication information that indicates a component carrier to be used for transmission of the response signal, wherein:

the plurality of component carriers include a first component carrier and a second component carrier other than the first component carrier, the first component carrier being a component carrier used for transmission of the response signal when downlink data is simultaneously assigned to both the first component carrier and the second component carrier, the first component carrier being a component carrier not used to indicate the indication information when multiple component carriers are used by the base station, and the second component carrier being a component carrier used for transmission of the response signal when downlink data is assigned to only the second component carrier;

the indication information is indicated to the terminal apparatus using the second component carrier when downlink data of at least the second component carrier is assigned; and when downlink data is simultaneously assigned to both the first component carrier and the second component carrier, the component carrier indicated by the indication information is the first component carrier, and when downlink data is assigned to only the second component carrier, the carrier component carrier indicated by the indication information is the second component carrier.

* * * * *